United States Patent
Lee et al.

(10) Patent No.: US 12,452,134 B2
(45) Date of Patent: Oct. 21, 2025

(54) EDGE COMPUTING SYSTEM AND METHOD

(71) Applicant: SAMSUNG ELECTRONICS CO., LTD., Suwon-si (KR)

(72) Inventors: Jongwon Lee, Suwon-si (KR); Moohyun Kim, Suwon-si (KR); Gajin Song, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/099,754

(22) Filed: Jan. 20, 2023

(65) Prior Publication Data
US 2023/0164033 A1 May 25, 2023

Related U.S. Application Data

(63) Continuation of application No. PCT/KR2021/009497, filed on Jul. 22, 2021.

(30) Foreign Application Priority Data

Jul. 22, 2020 (KR) .................. 10-2020-0091083

(51) Int. Cl.
*H04L 41/12* (2022.01)
*H04L 43/0811* (2022.01)

(52) U.S. Cl.
CPC .......... *H04L 41/12* (2013.01); *H04L 43/0811* (2013.01)

(58) Field of Classification Search
CPC .............................. H04L 41/12; H04L 43/0811
See application file for complete search history.

(56) References Cited

U.S. PATENT DOCUMENTS

| 10,341,868 B2 | 7/2019 | Ross et al. |
| 10,359,807 B2 | 7/2019 | Cronin et al. |

(Continued)

FOREIGN PATENT DOCUMENTS

| JP | 6574490 B2 | 9/2019 |
| KR | 10-2013-0113490 A | 10/2013 |

(Continued)

OTHER PUBLICATIONS

International Search Report (PCT/ISA/210) dated Oct. 26, 2021 issued by the International Searching Authority in International Application No. PCT/KR2021/009497.

(Continued)

*Primary Examiner* — Clayton R Williams
(74) *Attorney, Agent, or Firm* — Sughrue Mion, PLLC

(57) ABSTRACT

An electronic device includes: a communication module; a memory; and a processor configured to: receive a connection test command for a leaf device positioned in a network from an external server by using the communication module; based on receiving the connection test command, identify whether a connection to the leaf device is possible, by using the communication module, and transmit a result of the identification to the external server; based on identifying that the connection to the leaf device is possible, receive at least one module configured to perform an edge computing service from the external server, and store and install the at least one module in the memory; and execute the installed at least one module to perform the edge computing service, based on data received from the leaf device.

20 Claims, 20 Drawing Sheets

(56) References Cited

U.S. PATENT DOCUMENTS

| | | | |
|---|---|---|---|
| 10,880,230 B2 | 12/2020 | Kim | |
| 11,134,127 B2 | 9/2021 | Lee et al. | |
| 11,418,619 B1* | 8/2022 | Mattison | H04W 52/0216 |
| 2012/0178488 A1 | 7/2012 | Jonker et al. | |
| 2016/0182639 A1 | 6/2016 | Hong et al. | |
| 2017/0279774 A1 | 9/2017 | Booz et al. | |
| 2018/0263039 A1 | 9/2018 | Fang et al. | |
| 2018/0270141 A1* | 9/2018 | Burbridge | H04L 43/50 |
| 2019/0158370 A1 | 5/2019 | You et al. | |
| 2019/0182333 A1* | 6/2019 | Bartfai-Walcott | H04L 67/125 |
| 2020/0351380 A1* | 11/2020 | Fedorov | H04W 4/70 |
| 2021/0352090 A1 | 11/2021 | Kim et al. | |

FOREIGN PATENT DOCUMENTS

| | | |
|---|---|---|
| KR | 10-1471561 B1 | 12/2014 |
| KR | 10-1574026 A | 12/2015 |
| KR | 10-2017-0111175 A | 10/2017 |
| KR | 10-2018-0047070 A | 5/2018 |
| KR | 10-2018-0119162 A | 11/2018 |
| KR | 10-2019-0001890 A | 1/2019 |
| KR | 10-2019-0048117 A | 5/2019 |
| KR | 10-2019-0048890 A | 5/2019 |
| KR | 10-2019-0056957 A | 5/2019 |
| KR | 10-2020-0007754 A | 1/2020 |
| KR | 10-2020-0033092 A | 3/2020 |

OTHER PUBLICATIONS

Written Opinion (PCT/ISA/23) dated Oct. 26, 2021 issued by the International Searching Authority in International Application No. PCT/KR2021/009497.

* cited by examiner

ND METHOD

CROSS-REFERENCE TO RELATED APPLICATIONS

This application is a bypass continuation application of International Patent Application No. PCT/KR2021/009497, filed on Jul. 22, 2021, which is based on and claims priority to Korean Patent Application No. 10-2020-0091083, filed on Jul. 22, 2020 in the Korean Intellectual Property Office, the disclosures of which are incorporated by reference herein in their entireties.

BACKGROUND

1. Field

The disclosure relates to an edge computing system and, more specifically, an edge computing system including a leaf device, an edge device, and a cloud server, and a method for performing an edge computing service.

2. Description of Related Art

Cloud computing technology is a technology providing a computing resource existing at a location different from that of a user, to the user over a network to provide a computing service such as a server, a storage, software, or analysis. Data or contents of a user collected in an Internet of Things (IoT) device is stored in a cloud server, and a cloud service is provided to a user through processing of data.

In order to process data generated in an IoT system, cloud computing is used. In cloud computing, according to an increase of the number of devices configured for an IoT system and the amount of data, a load occurs in a system, and a security or privacy issue may occur in a data transfer and/or storage process. Furthermore, if an error occurs in a cloud server or there is no Internet connection, service provision is not possible.

In order to solve these problems of cloud computing, edge computing technology is used. Edge computing is an open architecture for extending a part of cloud computing and service to a device existing at an edge of a network. For example, when edge computing technology is used in an IoT system, an application or a service for which low latency and privacy are important among applications or services processed in a cloud server may be partially dispersedly processed on an edge device.

Edge computing technology is used in IoT systems. However, conventional edge computing service is provided via a fixed module to a fixed edge device. For example, an edge device connected to at least one leaf device and including software and/or hardware for processing data is required to exist in a home network.

According to the related art technology, an edge computing service might not be available according to a state (e.g., movement or lack of resource) of an edge device, and resources for edge computing are required to be secured.

SUMMARY

Provided is an edge computing system and an edge computing method by which edge computing is implementable using a device having idle computing power in a network.

Further, provided is an edge computing system and an edge computing method by which a module and/or service capable of edge computing is installed according to an electronic device registered in an IoT service (e.g., Smart-Things™) and/or devices that a user has.

Further still, provided is an edge computing system and an edge computing method using devices that a user has, as a leaf device or an edge device without a user input for use as a designated device (e.g., a leaf device or an edge device).

Additional aspects will be set forth in part in the description which follows and, in part, will be apparent from the description, or may be learned by practice of the presented embodiments.

According to an aspect of the disclosure, an electronic device includes: a communication module; a memory; and a processor configured to: receive a connection test command for a leaf device positioned in a network from an external server by using the communication module; based on receiving the connection test command, identify whether a connection to the leaf device is possible, by using the communication module, and transmit a result of the identification to the external server; based on identifying that the connection to the leaf device is possible, receive at least one module configured to perform an edge computing service from the external server, and store and install the at least one module in the memory; and execute the installed at least one module to perform the edge computing service, based on data received from the leaf device.

The processor may be further configured to transmit device information including at least one of identification information, position information, and network information of the electronic device to the external server to request registration of the electronic device.

The processor may be further configured to: identify at least one external device positioned in a network identical to that of the electronic device by using the communication module; transmit identification information of the at least one external device identified using the communication module to the external server; and receive a connection test command for the leaf device selected by a user device or the external server among the at least one external device.

The at least one module includes a device module configured to receive data transmitted from the leaf device and transmit the received data to the external server.

The processor may be further configured to, based on receiving data from the leaf device according to a first protocol, transmit the data to the external server according to a second protocol by using the device module.

The at least one module may include a service module configured to perform the edge computing service, based on the received data.

The service module may be configured to analyze video data received from the leaf device to perform a service including at least one of object recognition and object tracking.

The connection test command may be received from an Internet of Things (IoT) management server, and the at least one module may be received from an IoT hub server.

According to an aspect of the disclosure, an edge computing service support method of an Internet of Things (IoT) server, includes: transmitting, to at least one of an edge device and a leaf device selected by a user device, a test command for identifying whether the edge device and the leaf device are connectable to each other; based on identifying that that the edge device and the leaf device are connectable, determine at least one module required for performing an edge computing service, based on device information of the edge device and the leaf device; and transmitting the at least one module to the edge device, or requesting an IoT hub server to transmit the at least one module to the edge device.

The edge computing service support method may further include: receiving device information of the edge device from one of the user device and the edge device, and registering the edge device; and receiving device information of the leaf device from one of the user device and the leaf device and registering the leaf device.

The determining the at least one module required for performing the edge computing service may include: identifying a performable edge computing service to correspond to device information of the edge device and device information of the leaf device; and determining at least one module required for performing the edge computing service on a database.

The at least one module may include a device module configured to enable the edge device to receive data transmitted from the leaf device and transmit the received data to an external server, and a service module configured to enable the edge device to analyze data transmitted from the leaf device to perform the service.

The service module may be configured to analyze video data received from the leaf device to perform a service including at least one of object recognition and object tracking.

The edge computing service support method may include: based on the edge device not being connected to the leaf device, transmitting or receiving control information through a first channel connected to the leaf device, and receiving data obtained by the leaf device through a second channel connected to the leaf device; and based on the edge device being connected to the leaf device, maintaining the first channel and receiving data obtained by the leaf device from the edge device.

According to an aspect of the disclosure, an edge computing method of an electronic device, includes: receiving a connection test command for a leaf device positioned in a network from an external server; based on the receiving the connection test command, identifying whether a connection to the leaf device is possible, and transmitting a result of the identifying to the external server; based on identifying that the connection to the leaf device is possible, receiving at least one module configured to perform an edge computing service from the external server, and storing and installing the at least one module in a memory; and executing the installed at least one module to perform the edge computing service, based on data received from the leaf device.

The edge computing method may further include transmitting device information including at least one of identification information, position information, and network information of the electronic device to the external server to request registration of the electronic device.

The at least one module may include a device module configured to receive data transmitted from the leaf device and transmit the received data to the external server.

The executing the installed at least one module to perform the edge computing service may include transmitting data received from the leaf device according to a first protocol to the external server according to a second protocol by using the device module.

The at least one module may include a service module configured to perform the edge computing service, based on the received data.

According to various embodiments of the disclosure, edge computing may be implemented using a device having idle computing power in a network. Various other advantageous effects identified explicitly or implicitly through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
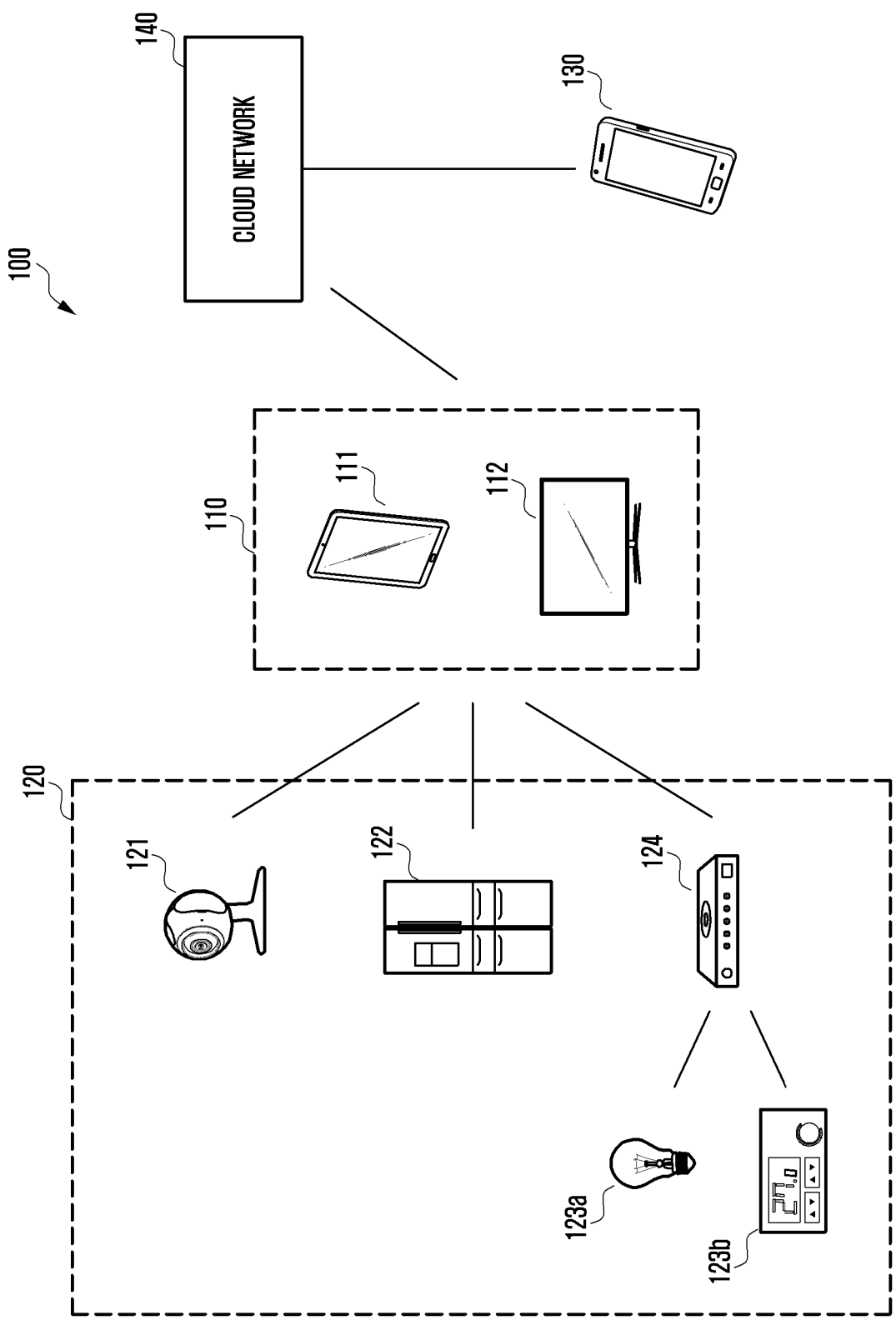
FIG. 1 illustrates devices in an IoT environment according to various embodiments.

Hereinafter, various embodiments disclosed in the present disclosure will be described with reference to the accompanying drawings. For convenience of explanation, the size of the components shown in the drawings may be exaggerated or reduced, and embodiments consistent with the disclosure are not necessarily limited by the drawings.

FIG. 1 illustrates devices in an example IoT environment (or IoT system) according to various embodiments.

Referring to FIG. 1, an IoT system (or edge computing system) 100 may include at least one leaf device 120, at least one edge device 110, a user device 130, and a cloud network 140. For example, the leaf device 120, the edge device 110, and the user device 130 may be arranged at adjacent positions (e.g., in home) and connected to the same home network (e.g., the same access point (AP)), and the cloud network 140 may be remotely located and connected to the leaf device 120, the edge device 110, and the user device 130 through Internet.

In the disclosure, according to a function or an operation of each device in the IoT system 100, devices may be classified as the leaf device 120, the edge device 110, and the user device 130, and then described. However, the same device (e.g., a smartphone or a tablet PC) may operate as one of the leaf device 120, the edge device 110, and the user device 130 in some cases. In other words, a name or a definition of a device described in the disclosure does not limit a function and/or an operation of the device.

According to various embodiments, the leaf device 120 is an end point of the IoT system 100, and may use a sensor to collect various data and transmit same to the edge device 110 or the cloud network 140. In addition, the leaf device 120 may perform various operations according to a command transferred from the cloud network 140 or the user device 130. Referring to FIG. 1, a device, such as a camera 121, a refrigerator 122, a bulb 123a, or a digital thermometer 123b, may be the leaf device 120.

According to various embodiments, the leaf device 120 may access the cloud network 140 through Internet, a device (e.g., the bulb 123a or the digital thermometer 123b) not supporting an Internet protocol (IP) among the leaf devices 120 may transmit sensed data to a hub device 124 via supported non-IP-based communication (e.g., Bluetooth™ or Zigbee™), and the hub device 124 may transmit sensing data of each leaf device 123a and 123b to the cloud network 140 through Internet. A detailed configuration and operation of the leaf device 120 will be described in more detail with reference to FIG. 5.

According to various embodiments, the cloud network 140 may include various server devices (e.g., an IoT management server and an IoT hub server) located on the network to support a cloud computing service in the IoT system 100. The cloud network 140 may perform computing processing of sensing data received from the leaf device 120, and transmit a command for controlling the leaf device 120.

According to various embodiments, the cloud network 140 may perform a function of operating and managing a particular device in a home network to operate as the edge device 110. For example, the cloud network 140 may include an IoT server (e.g., an IoT management server or an IoT hub server), and the IoT server may perform an edge computing service, such as registration, connection, or management of the edge device 110 and the leaf device 120, and provide a module (e.g., a device module or a service module) required for the edge computing service to the edge device 110.

According to various embodiments, the edge device 110 may process, by itself, data received from the leaf device 120, or transmit same to the cloud network 140 (e.g., IoT server). The edge device 110 may be a device, such as a TV 112 or a tablet PC 111, including a hardware and/or software resource required for an edge computing service. The edge device 110 may be connected to the cloud network 140 through Internet, and may establish a home network with the leaf device 120.

According to various embodiments, multiple edge devices 110 may exist in the home network, and the leaf device 120 may be connected to one of the multiple edge devices 110 and transmit data thereto. For example, when a particular leaf device 120 is connected to the edge device 110, the edge device may download a module (e.g., a device module or a service module) required for an edge computing service from the cloud network 140 and execute the same module.

According to various embodiments, the edge device 110 may perform a device unique function (e.g., a video output function of a TV), and may perform an edge computing service through a hardware and/or software resource at least partially simultaneously with performing the unique function, or for an idle time for which the unique function is not performed.

A detailed configuration and operation of the edge device 110 will be described in more detail with reference to FIG. 4.

According to various embodiments, the user device 130 may provide various user interfaces related to an edge computing service through an application. For example, the user device 130 may display, on a display, a data (e.g., camera video streaming) obtained by the leaf device 120, or result data (e.g., person recognition) obtained by processing the data by the edge device 110 or the cloud network 140. In addition, the user device 130 may receive a user input, such as connection of the edge device 110 and/or the leaf device 120, or registration thereof in a server, and transmit the same user input to the cloud network 140. A detailed configuration and operation of the user device 130 will be described in more detail with reference to FIG. 3.

In various embodiments of the disclosure, an edge computing service may be dynamically implemented using a device having idle computing power in a home network. To this end, when a device is determined as the edge device 110 for a particular leaf device 120 in a home network, the IoT system 100 may download and install, in the edge device 110, a module (e.g., a device module or a service module) required for an edge computing service, and perform the edge computing service by using corresponding modules. Accordingly, unlike a conventional technology providing an edge computing service to a fixed device via a fixed module, the edge device 110 may be dynamically configured.

Figure 2A:
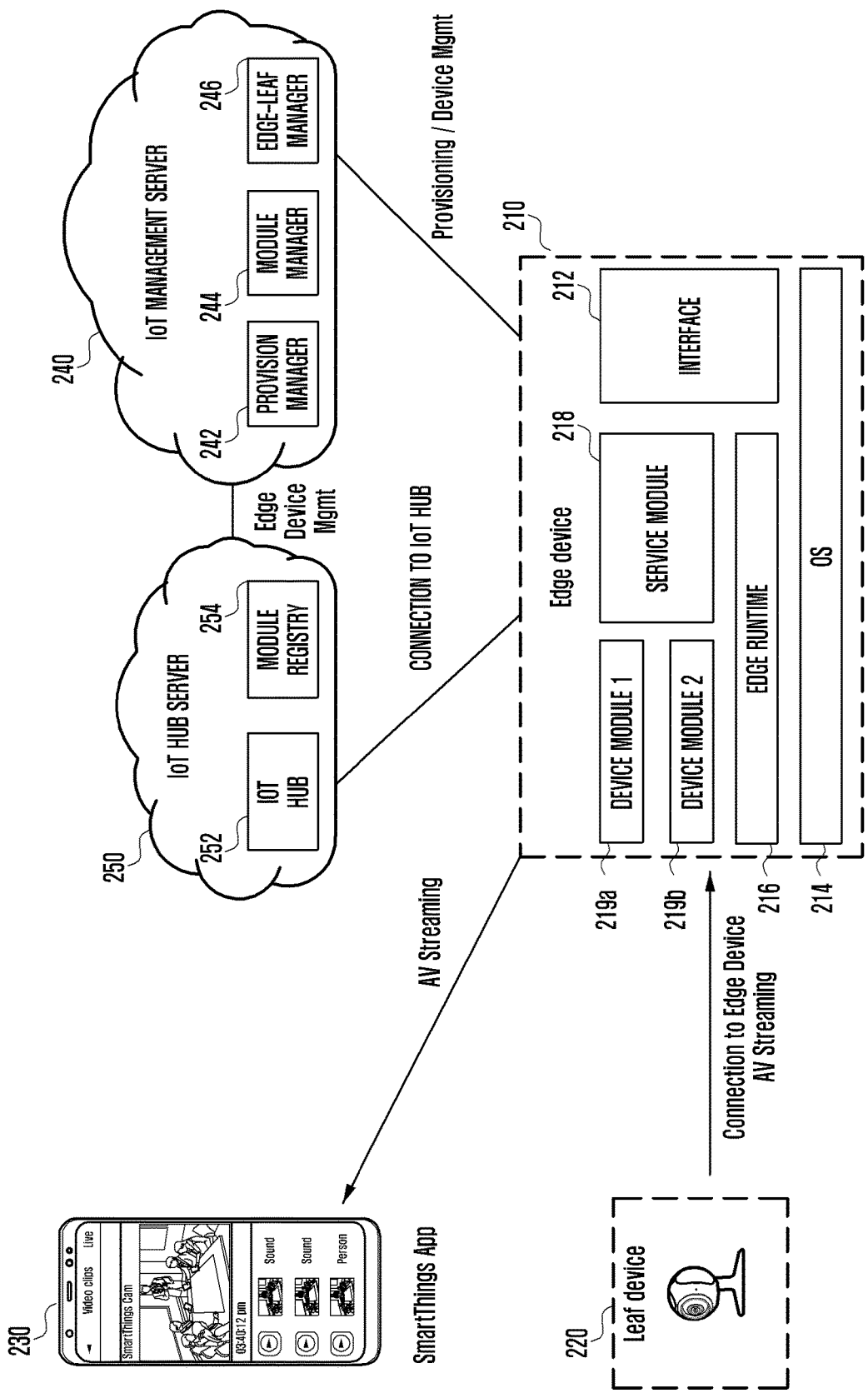
FIG. 2A and FIG. 2B illustrate devices of an edge computing system according to various embodiments.
Figure 2B:
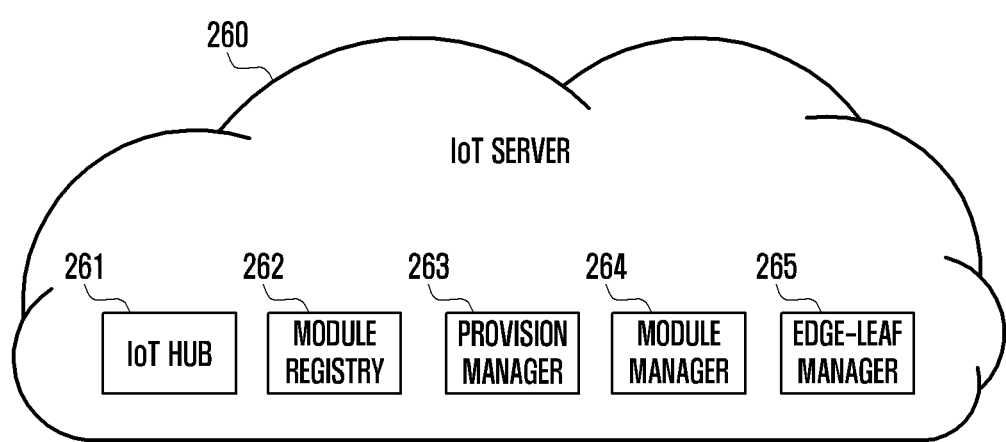

FIG. 2A and FIG. 2B illustrate devices of an example edge computing system according to various embodiments.

Referring to FIG. 2A, an edge computing system may include a leaf device 220, an edge device 210, a user device 230, an IoT hub server 250, and an IoT management server 240. As described with reference to FIG. 1, various IoT devices may exist on a home network, and in FIG. 2, one leaf device (e.g., the camera 121 in FIG. 1) and one edge device (e.g., the TV 112 in FIG. 1) are described as an example.

According to various embodiments, the IoT management server 240 (e.g., a SmartThings™ server) is a server device that provides various services for determination, connection, and/or operation of an edge computing service, and may include a provision manager 242, a module manager 244, and an edge-leaf manager 246.

According to various embodiments, the provision manager 242 may perform a function of relaying in the middle of the edge device 210 and the IoT hub server 250 to be connected to each other. For example, when the edge device 210 is initially registered in the IoT management server 240, the provision manager 242 may transmit, to the edge device 210, a connection string allowing the edge device 210 to be connected to the IoT hub server 250.

According to various embodiments, the module manager 244 may manage pieces of information on various modules provided for an edge computing service and a device supporting each service. The module required for performing an edge computing service may include a device module 219 that allows the edge device 210 to transmit data transmitted from the leaf device 220, to an external server (e.g., the IoT hub server 250), and a service module 218 including programs executed to implement a service in the edge device 210, based on data transmitted from the leaf device 220.

According to various embodiments, the edge-leaf manager 246 may manage a connection state between the edge device 210 and the leaf device 220 existing in several home networks. For example, if the leaf device 220 and the edge device 210 registered in the IoT management server 240 are connected to each other or disconnected from each other, the edge device 210 and/or the leaf device 220 may transmit connection or disconnection information to the IoT management server 240, and the IoT management server 240 may store information about which edge device 210 and which leaf device 220 are connected to each other in real time, and which service is being performed.

According to various embodiments, the IoT hub server 250 may support a cloud computing platform, and provide data required for connection between the leaf device 220 and the edge device 210 existing in a cloud environment. The IoT hub server 250 may include an IoT hub 252 and a module registry 254.

According to various embodiments, the module registry 254 may be a storage of modules (e.g., the device module 219 and the service module 218) required for performing an edge computing service.

According to various embodiments, the IoT hub 252 may maintain a connection with the edge device 210, provide a module stored in the module registry 254 to the edge device 210, and maintain information of modules installed in several edge devices 210.

According to various embodiments, the edge device 210 (e.g., the edge device 110 in FIG. 1) may be a device, such as a TV, a tablet PC, or a laptop PC, having a device unique function and including a hardware and/or software configuration (e.g., an edge runtime or a basic module) for an edge computing service. The edge device may perform an edge computing service through a hardware and/or software resource at least partially simultaneously with performing the unique function, or for an idle time for which the unique function is not performed.

According to various embodiments, the edge device 210 may include an interface 212 for communication with a cloud (e.g., the IoT management server 240 or the IoT hub server 250), an operating system (OS) 214, and an edge runtime 216. For example, the edge device 210 may need a hardware condition (e.g., CPU performance) for operating the operating system 214, and may be configured as a real time operating system (RTOS).

The edge runtime 216 and a basic module for edge computing may be installed in the edge device 210 through a software upgrade or a processing process of the edge device 210. The edge runtime 216 may include a daemon program for interworking with an IoT server, and the basic module is a program required for communication with the IoT server and may be configured as a container. For example, the basic module may be a container installed in an environment of the edge runtime 216.

According to various embodiments, when the edge device 210 is connected to a particular leaf device 220, the edge device 210 may receive and install at least one module for performing an edge computing service from the IoT hub server 250.

For example, the at least one module may be determined according to the type of the connected leaf device 220 and/or the type of a performable service, and may include the device module 219 corresponding to the corresponding leaf device 220 and/or the service module 218 corresponding to the type of a service to be performed. If the edge device 210 is connected to multiple leaf devices 220, the device module 219 (e.g., first device module 219a and second device module 219b) corresponding to each leaf device 220 may be installed. The edge device 210 may execute the edge runtime 216 in a provision process to be connected to the IoT hub server 250, and the at least one module may be additionally installed and executed according to the type of the leaf device 220. The edge device 210 may activate or deactivate an edge mode according to a command received from the IoT hub server 250 or the IoT management server 240. If an edge mode is deactivated, the edge device 210 may perform only a unique function (e.g., a video output function of a TV), and the device module 219 and the service module 218 need not be executed.

According to various embodiments, the leaf device 220 (e.g., the leaf device 120 in FIG. 1) may transmit data obtained using a sensor to the connected edge device 210 or a cloud network (e.g., the IoT management server 240 or the IoT hub server 250). For example, an Internet protocol (IP) camera operating as the leaf device 220 may be connected to the edge device 210 to transmit video streaming the edge device 210.

According to various embodiments, the user device 230 may be a device, such as a smartphone or a tablet PC, which is capable of executing various applications and includes a display capable of displaying a user interface (UI). The user device 230 may install and/or execute an application for an edge computing service, and receive contents and a notification generated in the leaf device 220 through the corresponding application. When the edge device 210 and the leaf device 220 are connected to each other, contents and a notification generated in the leaf device 220 may be transmitted to the user device 230 via the edge device 210.

According to various embodiments, a function of the IoT hub server 250 and the IoT management server 240 may be performed by one server device (e.g., the IoT server 260 in FIG. 2B). For example, referring to FIG. 2B, the IoT server 260 may include, as elements of the IoT hub server 250 and the IoT management server 240 described above, an IoT hub 261 (e.g., the IoT hub 252 in FIG. 2A), a module registry 262 (e.g., the module registry 254 in FIG. 2A), a provision manager 263 (e.g., the provision manager 242 in FIG. 2A), a module manager 264 (e.g., the module manager 244 in FIG. 2A), and an edge-leaf manager 265 (e.g., the edge-leaf manager 246 in FIG. 2A).

Alternatively, the functions may be performed by three or more multiple server devices. For example, each element of the IoT hub server 250 and the IoT management server 240 in FIG. 2A may be dispersedly arranged by three or more multiple server devices existing on a network, or some operations performed by each element may be dispersedly performed by several sever devices.

Figure 3:
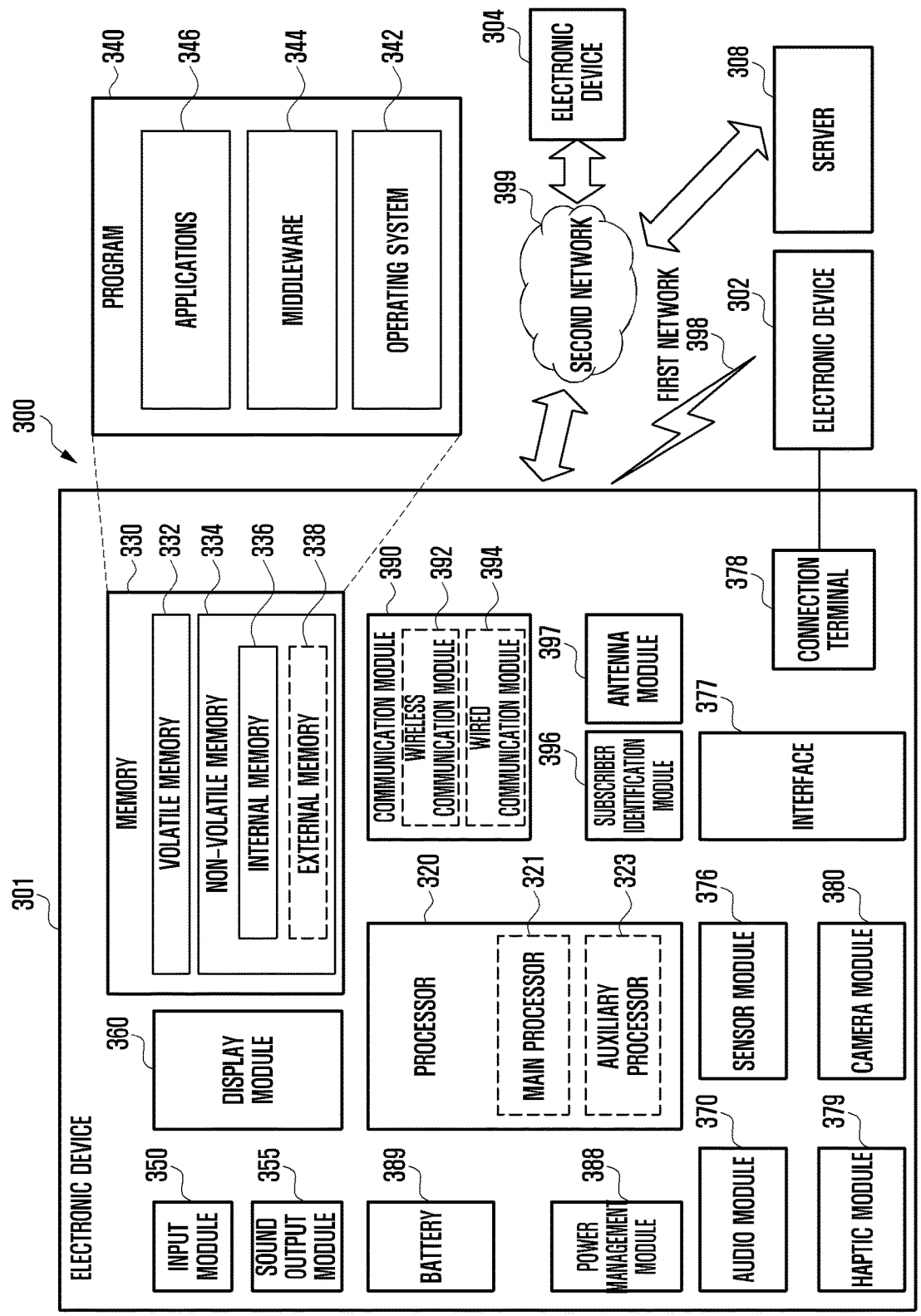
FIG. 3 is a block diagram illustrating a user device in a network environment according to various embodiments.

FIG. 3 is a block diagram illustrating a user device in a network environment according to various embodiments. Hereinafter, a user device (e.g., the user device 130 in FIG. 1 or the user device 230 in FIG. 2A) of an edge computing system may also be referred to as an electronic device 301.

Referring to FIG. 3, the electronic device 301 in a network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thererto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

According to various embodiments, a processor 320 may perform a control related to an edge computing service using an edge device (e.g., the edge device 210 in FIG. 2A) and a leaf device (e.g., the leaf device 220 in FIG. 2A) in a home network by using an application 346.

According to various embodiments, the application 346 may provide a function of registering an edge device and a leaf device in an IoT server (e.g., the IoT management server 240 in FIG. 2A). For example, the processor 320 may use a communication module 390 to discover at least one edge device and at least one leaf device in a home network, and receive device information (e.g., identification information or network information) of each device.

The processor 320 may display a list of identified devices on the application 346. The processor 320 may transmit, to the IoT server, device information of an edge device and a leaf device selected based on a user input, to request registration. In addition, the processor 320 may receive an input of the name and/or position information of each device on the application 346.

According to various embodiments, in a state where an edge mode of an edge device is deactivated, the processor 320 may receive data (e.g., video streaming or sound data) obtained by a sensor of a leaf device and transmitted from the leaf device, from a cloud network. Thereafter, when an edge computing service is initiated, the data obtained by the leaf device is transmitted to the edge device, and a user device (e.g., the user device 130 in FIG. 1, the user device 230 in FIG. 2A, or the electronic device 301) may directly receive sensor data and analysis data from the edge device or may receive same from the edge device via the cloud network (e.g., the cloud network 140 in FIG. 1).

According to various embodiments, at least one of elements of an edge device or a leaf device may be configured to be at least partially identical to or similar to an element of the electronic device 301 (e.g., a user device). For example, a sensor of a leaf device may perform a function and/or operation substantially the same as that of a sensor module 376 of the electronic device 301. In addition, a communication module (e.g., a communication module 420 in FIG. 4) of an edge device may perform a function and/or operation substantially the same as that of a communication module 390 of the electronic device 301, and an interface (e.g., the interface 212 in FIG. 2A) may perform a function and/or operation substantially the same as that of an interface 377 of the electronic device 301.

Figure 4:
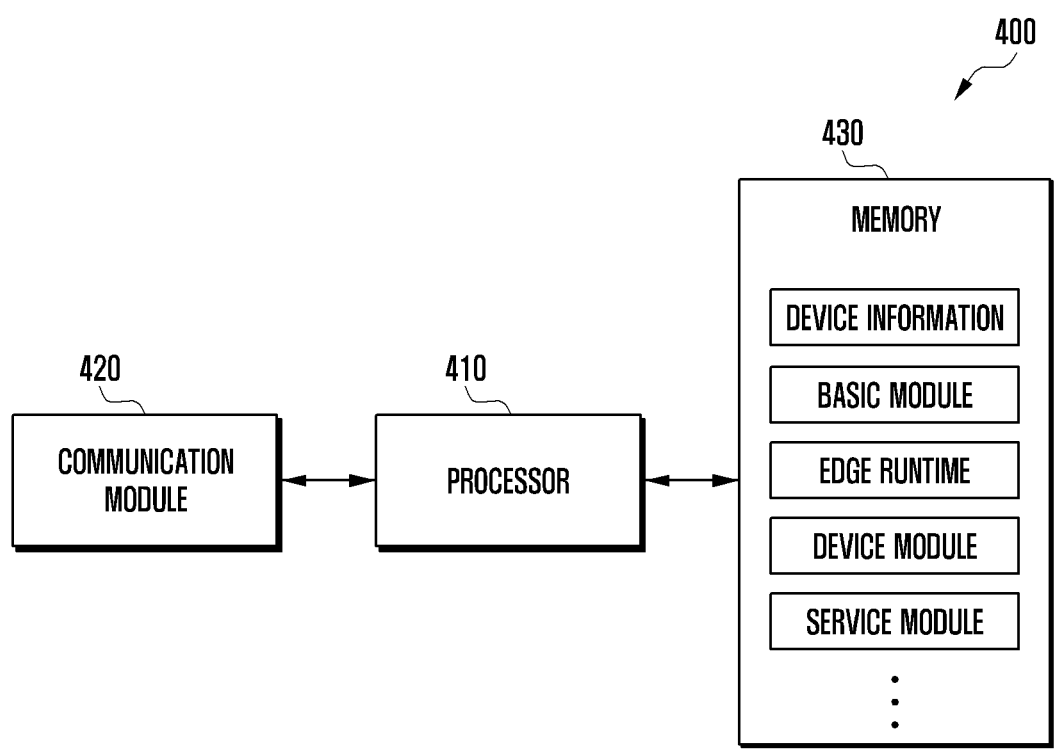
FIG. 4 is a block diagram illustrating an edge device according to various embodiments.

FIG. 4 is a block diagram illustrating an edge device according to various embodiments.

Referring to FIG. 4, an edge device 400 according to various embodiments may include the communication module 420, a processor 410, and a memory 430, and even though a part of the illustrated configuration is omitted or replaced, various embodiments disclosed herein may be implemented.

In an edge computing system according to various embodiments, multiple edge devices may exist, and each edge device may be a different type of device. For example, the edge device 400 may be implemented as a TV, a tablet PC, or a laptop PC. Hereinafter, a description of features for execution of, by the edge device 400, a device unique function will be omitted, and only operations required for operation as the edge device 400 in an edge computing system will be described.

According to various embodiments, the communication module 420 may support wireless communication (e.g., short-range communication (Wi-Fi) or cellular communication), and transmit or receive data to or from a leaf device (e.g., the leaf device 220 in FIG. 2A), a user device (e.g., the user device 230 in FIG. 2A), and an external server (e.g., the IoT management server or the IoT hub server in FIG. 2A). According to an embodiment, the communication module 420 may be connected to, as short-range communication, near field communication (NFC), Bluetooth™, Bluetooth™ low energy (BLE), WiFi Direct, a mesh network (e.g., Zigbee™ or z-wave), and/or ultra-wideband (UWB), and may be connected to a 4G network and/or a 5G network (e.g., standalone (SA) or non-standalone (NSA)) as cellular communication.

According to various embodiments, the memory 430 may include a volatile memory and/or a non-volatile memory, and may temporarily and/or permanently store various data used in at least one element (e.g., the processor 410) of the edge device 400. The memory 430 may store various instructions executable by the processor 410. Such instructions may include various control commands including arithmetic and logical operations, data transfer, and input/output which is recognizable by the processor 410.

Referring to FIG. 4, the memory 430 may store device information, an edge runtime, a basic module, a device module, and a service module.

According to various embodiments, the device information may include identification information of the edge device 400, and for example, include a device ID, a manufacturer, a model name, a capability, and a device type. In addition, the device information may further include at least a part of position information (e.g., a room or a living room) and network information (e.g., an IP address) of the edge device 400. At least a part (e.g., position information) of the device information may be input by a user on an application of a user device (e.g., the electronic device 301 in FIG. 3 or the user device 130 in FIG. 1).

According to various embodiments, the edge runtime may include a daemon program for interworking with an IoT server. The edge runtime is not executed in a state where an edge mode of the edge device 400 is deactivated, and, if a connection string is received from the IoT server (e.g., the IoT management server 240 in FIG. 2A), may be executed using a value thereof.

According to various embodiments, the basic module is a program required for communication with the IoT server and may be configured as a container. The edge runtime and the basic module for edge computing may be installed in the edge device 400 through a software upgrade or a processing process of the edge device 400. According to an embodiment, the edge device 400 may perform an over-the-air (OTA) software update as the software upgrade. For example, the OTA software update may include open mobile alliance (OMA) download, firmware OTA (FOTA), or plain FTP.

According to various embodiments, the edge device 400 may store the device module and the service module as modules required for an edge computing service. The device module may correspond to each connected leaf device, and the service module may correspond to each service to be performed. For example, multiple device modules and/or multiple service modules may be installed according to the number of connected leaf devices and the number of services to be performed (e.g., first device module 219a and second device module 219b in FIG. 2).

According to various embodiments, the device module may include programs supporting to convert data received from a leaf device according to a first protocol according to a second protocol (e.g., message queue telemetry transport (MQTT)) and transmit the converted data to an external server. According to an embodiment, the first protocol and the second protocol may be protocols related to a control channel for communication of the edge device 400 with the IoT server, and the first protocol may include a web socket. For example, the control channel is a channel for providing and/or processing device information, and the edge device 400 may use the control channel to communicate with the IoT server. In addition, the service module may include programs for processing and/or analyzing received data.

At the time of a software upgrade or a processing process of the edge device 400, the edge runtime and the basic module may be installed without also installing the device module and the service module. Thereafter, when the edge device 400 is connected to a leaf device, the edge device may download and install the device module and the service module from the IoT server (e.g., the module registry 254 in FIG. 2A).

The memory 430 may further store various programs for executing a unique function (e.g., a video output function of a TV) of the edge device 400 other than the illustrated configuration.

According to various embodiments, the processor 410 is an element which is capable of performing calculation or data processing related to control and/or communication of each element of the edge device 400, and may be operatively, functionally, and/or electrically connected to each element of the edge device 400, such as the communication module 420 or the memory 430.

According to various embodiments, there may be no limit to calculation and data processing functions which is implementable by the processor 410 in the edge device 400. However, hereinafter, operations for connecting, by the edge device 400, to a leaf device for an edge computing service and receiving and installing a module required for the edge computing service will be described.

According to various embodiments, the processor 410 may register device information of the edge device 400 in the IoT server (e.g., the IoT management server 240 in FIG. 2A). Here, the device information may include at least a part of identification information, position information, and network information of the edge device 400. For example, the processor 410 may transmit device information stored in the memory 430 to a user device, the device information of the edge device 400 may be transmitted to the IoT server through an application of the user device, and the edge device 400 may be registered. If the device information of the edge device 400 is changed, the processor 410 may transmit updated information to the user device and/or the IoT server. In addition, for example, the edge device 400 may be in a state where an edge mode is activated and thus the edge runtime is operating (being executed). According to various embodiments, the processor 410 may receive a connection test command from the IoT server (e.g., the IoT management server 240 in FIG. 2A) via the communication module 420. The connection test command may include identification information and/or network information of a leaf device. The IoT server may search for at least one leaf device connectable with the edge device 400 among pre-registered several leaf devices, and transmit a connection test command for a leaf device selected by the user device to the edge device 400.

According to various embodiments, the processor 410 may use the communication module 420 to identify at least one external device located on the same network as that of the electronic device, and may transmit identification information of the at least one external device to the IoT server. In addition, when a particular leaf device is selected by the user device among the at least one external device, the IoT server may transmit a connection test command for the corresponding leaf device to the edge device 400.

According to various embodiments, the processor 410 may identify whether a connection to the leaf device is possible, by using the communication module 420, in response to reception of a connection test command. The processor 410 may transmit a connection test result to the IoT server.

According to various embodiments, the processor 410 may receive at least one module (e.g., a device module or a service module) for performing an edge computing service from the IoT server (e.g., the IoT hub server 250 in FIG. 2A) via the communication module 420, and store and install the received module in the memory 430. The IoT server may identify a performable edge computing service, based on device information (e.g., a device ID, a manufacturer, a model name, a capability, and a device type of the edge device 400) of the edge device 400 and device information (e.g., a device ID, a manufacturer, a model name, a capability, and a device type of a leaf device) of a leaf device, and provide a module required for performing the corresponding service to the processor 410.

For example, if the leaf device is an IP camera, the IoT server may provide an audio video module (AV module) required for receiving video streaming transmitted from the leaf device and transmitting same to a cloud network, and an artificial intelligence vision module (AI vision module) that performs video analysis in an artificial intelligence vision (AI vision) service. Alternatively, if the leaf device is an AI speaker, the IoT server may provide a sound module required for required for receiving sound data transmitted from the leaf device and transmitting same to the cloud network, and an AI sound analysis module that analyzes the received sound data.

As described above, when a leaf device is connected, modules required for an edge computing service may be installed in the edge device 400, thereby dynamically implementing the edge computing service by using an idle computing resource of the edge device 400. According to an embodiment, an edge device and a leaf device may generate a third channel (e.g., a control channel) for processing control information (e.g., control information, event information, or device information) and a fourth channel (e.g., a streaming channel) for processing (e.g., transferring) video information (e.g., video streaming). In addition, when the edge device and the leaf device are connected to each other, video information may be transferred to the edge device by using the fourth channel rather than a second channel (e.g., streaming channel) between a first channel (e.g., a control channel) and the second channel (streaming channel) between the leaf device and the IoT server, which are existing channels. According to various embodiments, the processor 410 may execute the stored device module and service module, and perform an edge computing service, based on data received from the leaf device. For example, if the leaf device is an IP camera, the edge device 400 may provide various video analysis-based services, such as facial recognition, or user recognition and tracking, by analyzing a received video by using the AI vision module. Alternatively, if the leaf device is an AI speaker, the edge device 400 may perform a service, such as pet monitoring, window damage detection, or alarm sound detection, by analyzing sound data by using the AI sound analysis module.

The processor 410 may transmit sensor data received from the leaf device and analysis data generated by the service module to the IoT server in real time by using the communication module 420. According to another embodiment, the edge device 400 may transfer information (e.g., video information, sensor data, or analysis data) obtained by the leaf device, to the user device without using the IoT server.

According to various embodiments, the processor 410 may disconnect two devices therebetween if the leaf device disappears from a home network (e.g., disconnection from AP). In this case, the processor 410 may report disconnection between two devices to the IoT server. When two devices are disconnected from each other, the leaf device may access the cloud network again and a service may be continuously provided. For example, the leaf device may use the first channel (e.g., control channel) and the second channel (e.g., streaming channel) generated between the leaf device and the IoT server, to provide a service of the leaf device to the user device.

Figure 5:
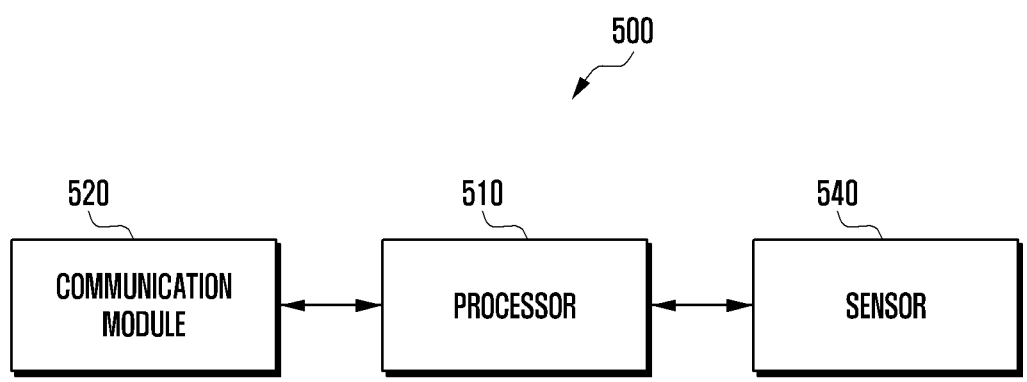
FIG. 5 is a block diagram illustrating a leaf device according to various embodiments.

FIG. 5 is a block diagram illustrating a leaf device according to various embodiments.

Referring to FIG. 5, a leaf device 500 according to various embodiments may include the communication module 520, a processor 510, and a sensor 540, and even though a part of the illustrated configuration is omitted or replaced, various embodiments disclosed herein may be implemented.

In an edge computing system according to various embodiments, multiple leaf devices 500 may exist, and each leaf device 500 may be a different type of device. For example, the leaf device may be implemented as a camera, a refrigerator, a bulb, or a digital thermometer. Hereinafter, a description of features for execution of, by the leaf device 500, a device unique function will be omitted, and only operations required for operation as the leaf device 500 in an edge computing system will be described.

According to various embodiments, the communication module 520 may support wireless communication (e.g., Wi-Fi or cellular communication), and transmit or receive data to or from an edge device (e.g., the edge device 210 in FIG. 2A or the edge device 400 in FIG. 4), a user device (e.g., the user device 230 in FIG. 2A or the user device 301 in FIG. 3), and an external server (e.g., the IoT management server 240 or the IoT hub server 250 in FIG. 2A).

According to various embodiments, the leaf device 500 may include the at least one sensor 540. For example, if the leaf device 500 is an IP camera, the leaf device may include an image sensor that obtains surrounding video data, and if the leaf device 500 is an AI speaker, the leaf device may include a microphone that detects surrounding sound. Alternatively, the leaf device 500 may include the sensor 540 for detecting various data, such as temperature, pressure, or impact amount, according to the type thereof.

According to various embodiments, the processor 510 is an element which is capable of performing calculation or data processing related to control and/or communication of each element of the leaf device 500, and may be operatively, functionally, and/or electrically connected to each element of the leaf device 500, such as the communication module 520 or the sensor 540.

According to various embodiments, the processor 510 may register device information of the leaf device 500 in the IoT server. Here, the device information may include at least a part of identification information, position information, and network information of an edge device. For example, the processor 510 may transmit device information stored in the memory to a user device, the device information of the leaf device 500 may be transmitted to the IoT server through an application of the user device, and the leaf device 500 may be registered.

According to various embodiments, in a state where the leaf device 500 is not connected to an edge device, the processor 510 may transmit data (e.g., video streaming) obtained via the sensor 540, to the IoT server. According to various embodiments, the leaf device 500 may establish a first channel (e.g., control channel) and a second channel (e.g., streaming channel) with the IoT server, the leaf device 500 and the IoT server may transmit or receive control information and/or event information through the first channel, and video streaming obtained by the leaf device 500 may be transmitted to the IoT server (or a cloud network) through the second channel.

According to various embodiments, in response to a connection test command received from the IoT server, the processor 510 may attempt to connect an edge device via the communication module 520 and transmit a test result to the IoT server. Thereafter, the processor 510 may establish a connection with an edge device via the communication module 520.

For example, in response to a connection test command received from the IoT server, the processor 510 may broadcast, on a local network, data (e.g., video streaming) sensed and transmitted by the leaf device 500 and a signal including a service performable using the leaf device 500. At least partially at the same time, the edge device may broadcast, on the local network, a signal including an edge computing service performable by the edge device. The processor 510 may identify which service is providable by the edge device, from the signal broadcast from the edge device, then identify whether an edge computing service for data of the leaf device 500 is possible, and attempt to connect the edge device.

According to various embodiments, if the leaf device 500 is connected to the edge device and an edge mode of the edge device is activated, the leaf device 500 may transmit sensor data to the edge device through the established connection. In this case, the edge device and the leaf device 500 may establish a third channel (e.g., control channel) for transmitting or receiving control information and/or event information, and establish a fourth channel (e.g., streaming channel) for transmitting or receiving video streaming. While video streaming is transmitted to the edge device through edge computing, the second channel for transmission or reception of sensor data between the leaf device 500 and the IoT server need not be used.

According to various embodiments, if the processor 510 is disconnected from the edge device, the processor may transmit sensor data to the IoT server again.

Figure 6:
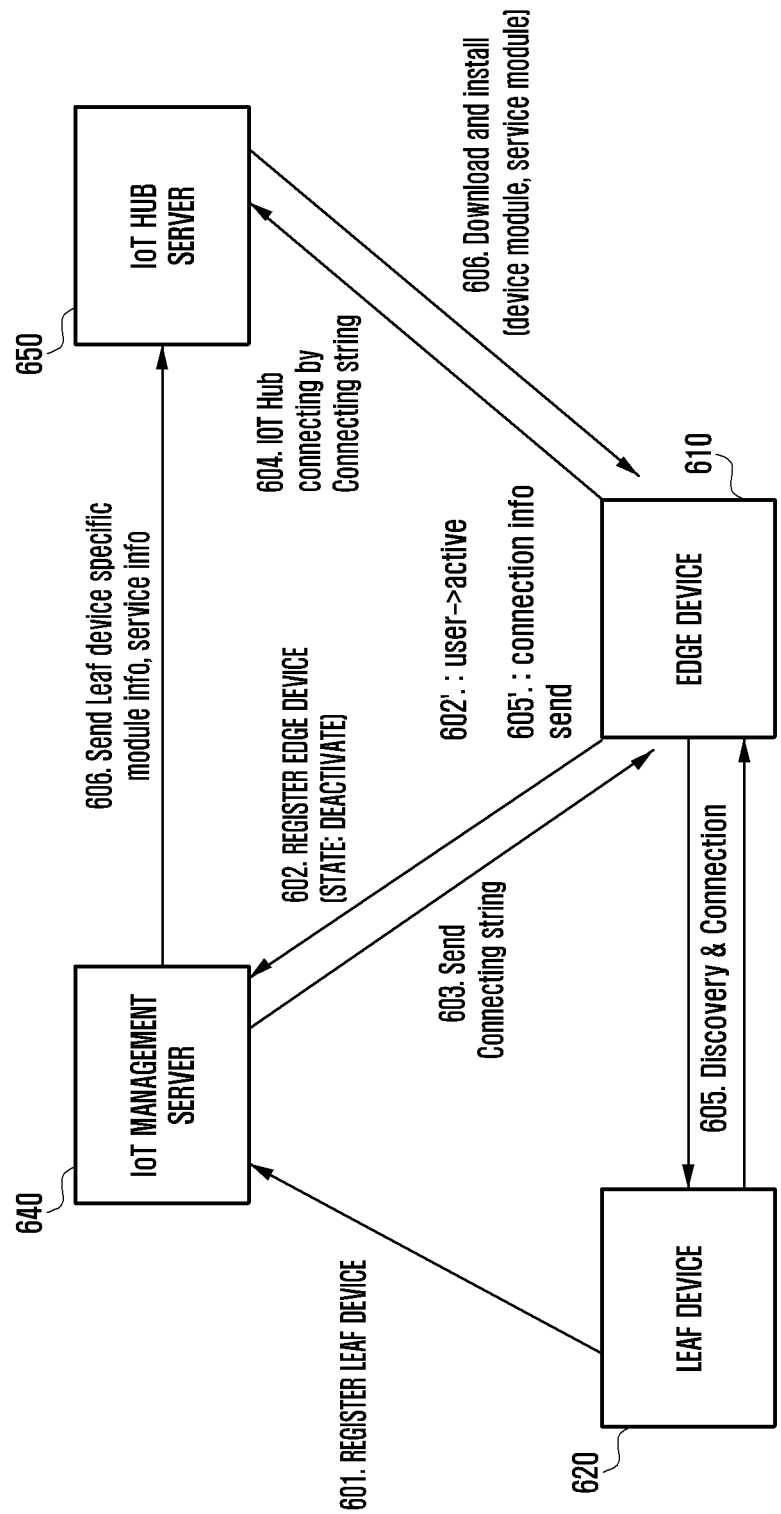
FIG. 6 is a component diagram illustrating interactions between devices of an edge computing system according to various embodiments.

FIG. 6 is a component diagram illustrating interactions between devices of an edge computing system according to various embodiments.

In FIG. 6, an IoT management server 640 (e.g., the IoT management server 240) and an IoT hub server 650 (e.g., the IoT hub server 250 in FIG. 2A) and in FIG. 2A) are illustrated as a device on a cloud network. However, a function of the IoT management server 640 and the IoT hub server 650 may be implemented by one server device (e.g., the IoT server 260 in FIG. 2B) or may be dispersedly processed by three or more devices. An edge device 610 and a leaf device 620 may be connected to each other on the same home network.

According to various embodiments, in operation 601, the leaf device 620 (e.g., the leaf device 220 in FIG. 2A or the leaf device 500 in FIG. 5) may register device information of the leaf device 620 in the IoT management server 640 (e.g., SmartThings™ server). The device information of the leaf device 620 may include at least a part of identification information (a device ID, a manufacturer, a model name, a capability, and a device type), position information (e.g., a room or a living room) and network information (e.g., an IP address) of the leaf device 620. According to an embodiment, there may be various methods for connecting to the IoT server according to the device information of the leaf device 620. For example, if the leaf device 620 is an IP-based (IP address) device, the leaf device may connect to the IoT server (e.g., the IoT management server 640) by using a service set identifier (SSID), and if the leaf device is not an IP-based device (e.g., BLE, Zigbee™, or z-wave), the leaf device may connect to the IoT server (e.g., the IoT management server 640) via a hub device (e.g., the hub device 124 in FIG. 1) or by using a user device (e.g., the user device 230 in FIG. 2A or the user device 301 in FIG. 3) as a hub device. According to various embodiments, in operation 602, the edge device 610 (e.g., the edge device 210 in FIG. 2A or the edge device 400 in FIG. 4) may register device information of the edge device 610 in the IoT management server 640. The device information of the edge device 610 may include at least a part of identification information (a device ID, a manufacturer, a model name, a capability, and a device type), position information (e.g., a room or a living room) and network information (e.g., an IP address) of the edge device 610. For example, the edge device 610 may transmit the device information of the edge device 610 to the IoT management server 640 in a deactivated state of an edge mode. For example, in a state where an edge runtime is not executed, the edge device 610 may execute a basic module (e.g., a container of a program required for communication with the IoT management server 640) for edge computing to transmit the device information. In this embodiment, the edge device 610 installs an edge runtime and a basic module for edge computing, but a module (e.g., the device module 219 or the service module 218 in FIG. 2A) for executing an edge computing service for data transmitted from the leaf device 620 might not have been installed yet.

According to various embodiments, the IoT management server 640 may store pieces of information received from the at least one leaf device 620 and/or the edge device 610 in a memory (e.g., a database).

According to various embodiments, operations 601 and 602 may be collectively referred to as a process of registration in an IoT server device.

According to various embodiments, in operation 602', a user may select execution of an edge mode of the edge device 610 on an application of a user device (e.g., the user device 230 in FIG. 2A or the user device 301 in FIG. 3). The application of the user device may transmit information on the selected edge device 610 and/or leaf device 620 to the IoT management server 640. According to various embodiments, in operation 603, the IoT management server 640 (e.g., the provision manager 242 in FIG. 2A) may transmit a connection string to the edge device 610 to be connected to the IoT hub server 650. According to various embodiments, in operation 604, the edge device 610 may receive an issued connection string and use a value thereof to execute the edge runtime and activate an edge mode. The edge device 610 may be connected to the IoT hub server 650 by execution of the edge runtime. For example, the connection string is an identification (ID) for interworking with the IoT hub server 650 and may be data allowing identification of the IoT hub server 650. According to various embodiments, operations 602', 603, and 604 may be collectively referred to as a process of installation of an edge runtime.

According to various embodiments, in operation 605, the edge device 610 and the leaf device 620 may each identify (discover) whether a device capable of edge computing exists on the home network. For example, the edge device 610 may identify the leaf devices 620 accessing the same access point (AP). According to various embodiments, the edge device 610 and the leaf device 620 may identify (discover) whether there is a device capable of edge computing in a device-to-device (D2D) scheme rather than an IP-based AP device. For example, the edge device 610 and the leaf device 620 may perform a discovery process (e.g., operation 605 and operation 605') through establishment of communication such as BLE or WiFi Direct.

According to various embodiments, in operation 605', the edge device 610 and/or the leaf device 620 may transmit information of a device connectable on the home network to the IoT management server 640. According to another embodiment, the IoT management server 640 may search for the leaf device 620 connectable with the edge device 610, based on account and/or position information from device information of registered devices, and transfer same to the edge device 610 and/or the leaf device 620.

According to various embodiments, when a connection between the edge device 610 and the leaf device 620 is established, the IoT management server 640 (e.g., the edge-leaf manager 246 in FIG. 2A) may identify a service available via the edge device 610 and the leaf device 620. For example, if the leaf device 620 is an IP camera, it may be identified that an AI vision service including video analysis is possible.

According to various embodiments, the IoT management server 640 may identify at least one module required by the edge device 610 for the identified edge computing service. The module for an edge computing service may include a device module supporting to receive data transmitted from the leaf device 620 and transmit same to the cloud network, and a service module including programs for performing the edge computing service, based on the received data. For example, the IoT management server 640 may identify an AV module required for the edge device 610 to transmit video streaming transmitted from the leaf device 620, which is an IP camera, to the cloud network, and an AI vision module that performs video analysis in an AI vision service.

The IoT management server 640 may store information of modules required for each edge computing service, as described above, in a database. According to various embodiments, operations 605 and 605' may be referred to as a discovery process.

According to yet another embodiment, the process of installation of the edge runtime according to operations 602', 603, and 604 may be executed after the discovery process of operations 605 and 605' unlike the illustrated embodiment.

According to various embodiments, the edge device 610 and the leaf device 620 may be connected to each other through an authentication process. When the edge device 610 and the leaf device 620 are connected to each other, connection between two devices may be updated in the IoT management server 640 (e.g., the edge-leaf manager in FIG. 2A).

According to various embodiments, in operations 606 and 607, the IoT management server 640 (e.g., the module manager in FIG. 2A) may transmit information of a module required for an edge computing service (e.g., AI vision service) to the IoT hub server 650 and/or the edge device 610. The edge device 610 may receive the information of the required module, and the edge runtime may download the corresponding module from the IoT hub server 650 (e.g., the module registry 254 in FIG. 2A) in the edge runtime and install same on the edge device 610.

According to various embodiments, when the installed module (e.g., a device module or a service module) is updated, the edge device 610 may download and install a new module from the IoT hub server 650 (e.g., the module registry 254 in FIG. 2A). According to various embodiments, when the existing edge device 610 performs an image classification function using data received via the leaf device 620 (e.g., IP camera), the new edge device 610 may perform an image analysis function related to image classification and additional functions (e.g., facial recognition), based on an update operation.

According to various embodiments, in a state where the edge device 610 is connected to the leaf device 620, the edge device may always execute a device module corresponding to the corresponding leaf device 620 in order to receive data from the leaf device 620. The device module may receive data from the leaf device 620 via a first protocol, and transmit data to the IoT server via a second protocol.

The leaf device 620 may transmit obtained data (e.g., video streaming) to the cloud network (e.g., the IoT management server 640) before being connected to the edge device 610, and may transmit data and events to the edge device 610 in a state where the leaf device is connected to the edge device 610. The edge device 610 may transmit at least a part of the data and events received from the leaf device 620, to the cloud network (e.g., the IoT management server 640).

According to various embodiments, the two devices may be disconnected from each other if the edge device 610 and/or the leaf device 620 disappear from the home network (e.g., disconnection from AP). In this case, disconnection between the two devices may be updated in the IoT management server 640 (e.g., the edge-leaf manager 246 in FIG. 2A). When the two devices are disconnected from each other, the leaf device 620 may access the cloud network again and a service may be continuously provided.

Figure 7:
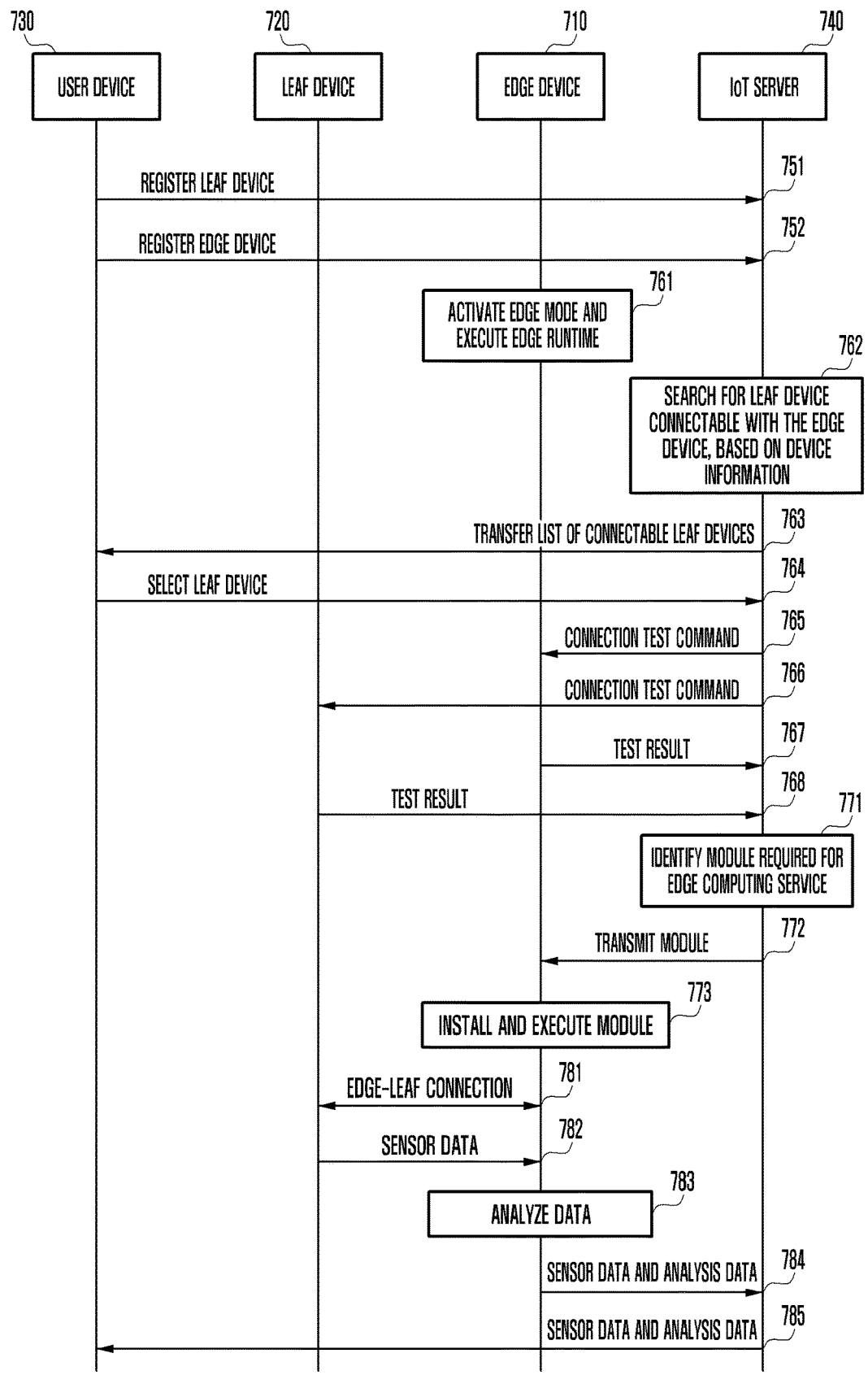
FIG. 7 is a sequence diagram illustrating an edge computing service method according to various embodiments.

FIG. 7 is a sequence diagram illustrating an edge computing service method according to various embodiments.

Referring to FIG. 7, an edge computing system may include a user device 730, a leaf device 720, an edge device 710, and an IoT server 740. The IoT server 740 may include multiple server devices (e.g., the IoT management server 240 and the IoT hub server 250 in FIG. 2A) existing on a cloud network, and operations thereof may be dispersedly processed by several server devices.

According to various embodiments, in operation 751, the user device 730 may identify device information of the leaf device 720, and register the device information of the leaf device 720 in the IoT server 740. The user device 730 may identify the device information of the leaf device 720 on a home network through a discovery process, and the device information of the leaf device 720 may include at least a part of identification information (a device ID, a manufacturer, a model name, a capability, and a device type), position information (e.g., a room or a living room) and network information (e.g., an IP address) of the leaf device 720. If a corresponding device is the leaf device 720 is checked on an application of the user device 730, registration of the corresponding device in the IoT server 740, as the leaf device 720, may be requested. In addition, position information (e.g., room or living room) of the leaf device 720 may be registered on the application of the user device 730, and then be transmitted to the IoT server 740.

According to various embodiments, in operation 752, the user device 730 may identify device information of the edge device 710, and register the device information of the edge device 710 in the IoT server 740. The user device 730 may identify the device information of the edge device 710 on the home network through a discovery process, and the device information of the edge device 710 may include at least a part of identification information (a device ID, a manufacturer, a model name, a capability, and a device type), position information (e.g., a room or a living room) and network information (e.g., an IP address) of the edge device 710. When a corresponding device is the edge device 710 is checked on the application of the user device 730, registration of the corresponding device in the IoT server 740, as the edge device 710, may be requested. In addition, position information (e.g., room or living room) of the edge device 710 may be registered on the application of the user device 730, and then be transmitted to the IoT server 740. In a process of registering the edge device 710, an edge mode of the edge device 710 need not be activated.

According to various embodiments, pieces of information received from the at least one leaf device 720 and the edge device 710 may be stored in a database, and a registration account and position information of each device and whether each device is the leaf device 720 or the edge device 710 may be stored.

According to various embodiments, in operation 761, the edge device 710 may execute an edge runtime and activate an edge mode. The edge device 710 may receive a connection string issued from the IoT server 740 and use a value thereof to execute the edge runtime.

According to various embodiments, in operation 762, the IoT server 740 may search for at least one leaf device 720 connectable with the edge device 710 among a plurality of pre-registered leaf devices 720. If the user device 730 selects a particular edge device 710 to perform an edge computing service, the IoT server 740 may identify a user account, device information and position information of the selected edge device 710, and a local network, and may search for leaf devices 720 connectable with the edge device 710 on the database, based on the corresponding pieces of information.

According to various embodiments, in operation 763, the IoT server 740 may provide a list of leaf devices 720 connectable with the edge device 710 to the user device 730.

According to various embodiments, in operation 764, the user device 730 may provide the received list through the application, select the leaf device 720 to be connected to the edge device 710 on the list according to a user input, and transmit same to the IoT server 740.

According to an embodiment, to enable operations 763 and 764, the user device 730 may provide a user interface (e.g., FIG. 9A to FIG. 9C) related to an operation of selecting a leaf device. According to another embodiment, the user device 730 may provide a user interface (e.g., FIG. 10A to FIG. 10C) related to an operation of selecting an edge device, based on a user input obtained from the user device 730.

According to various embodiments, in operation 765 and operation 766, the IoT server 740 may transmit a connection test command to the edge device 710 and the leaf device 720. For example, the IoT server 740 may transmit identification information and/or network information of a counterpart device to request identification of whether a connection to the counterpart device is possible.

According to various embodiments, in operation 767 and operation 768, the edge device 710 and/or the leaf device 720 may attempt to connect to each other on the home network, and transmit a test result to the IoT server 740. The IoT server 740 may transmit a connection test result of the edge device 710 and the leaf device 720 to the user device 730, and the user device 730 may provide a user interface related to the connection test result. For example, the user interface of the user device 730 may provide an interface screen relating to a connection attempt process, such as connection request, connection failure, or establishment of a connectivity channel on the home network by the edge device 710 and the leaf device 720, and/or, if a message is mutually transmitted or received through a connectivity channel and a process of authentication on whether a device is a reliable device is completed, may provide information related to success or failure of the authentication.

According to various embodiments, in operation 771, if the edge device 710 and the leaf device 720 are identified as being connectable with each other, the IoT server 740 may identify at least one module required for an edge computing service. For example, the IoT server 740 may identify a performable edge computing service, based on device information (e.g., a device ID, a manufacturer, a model name, a capability, and a device type of the edge device 710) of the edge device 710 and device information (e.g., a device ID, a manufacturer, a model name, a capability, and a device type of the leaf device 720) of the leaf device 720.

According to various embodiments, the IoT server 740 may match performable services with device information of several devices and store same in the database. In addition, the IoT server 740 may store a module required for each service and modules required for transmitting and/or processing data of a particular device.

According to various embodiments, the at least one module for an edge computing service may include a device module supporting to receive data transmitted from the leaf device 720 and transmit same to the cloud network, and a service module including programs for performing the edge computing service, based on the received data. For example, the device module may include programs supporting to convert data received from the leaf device 720 according to a first protocol according to a second protocol (e.g., message queue telemetry transport (MQTT)) and transmit the converted data to an external server. In addition, the service module may include programs for processing and/or analyzing received data.

For example, if the leaf device 720 is an IP camera, the IoT server 740 may identify an AV module required for receiving video streaming transmitted from the leaf device 720, and transmitting same to the cloud network, and an AI vision module that performs video analysis in an AI vision service. Alternatively, if the leaf device 720 is an AI speaker, the IoT server 740 may identify a sound module required for required for receiving sound data transmitted from the leaf device 720 and transmitting same to the cloud network, and an AI sound analysis module that analyzes the received sound data.

According to various embodiments, in operation 772, the IoT server 740 may transmit an identified module (e.g., AV module and AI vision module) to the edge device 710.

According to various embodiments, in operation 773, the edge device 710 may install and execute received modules.

According to various embodiments, in operation 781, the edge device 710 and the leaf device 720 may establish a connection therebetween through mutual authentication.

According to various embodiments, in operation 782, the leaf device 720 may transmit data (e.g., video streaming) obtained using a sensor to the edge device 710 by using the established connection.

According to various embodiments, in operation 783, the edge device 710 may analyze data received from the leaf device 720. For example, if the leaf device 720 is an IP camera, the edge device 710 may provide various video analysis-based services, such as facial recognition, or user recognition and tracking, by analyzing a received video by using the AI vision module. Alternatively, if the leaf device 720 is an AI speaker, the edge device 710 may perform a service, such as pet monitoring, window damage detection, or alarm sound detection, by analyzing sound data by using the AI sound analysis module.

According to various embodiments, in operation 784, the edge device 710 may transmit the data received from the leaf device 720 and the data analyzed by the edge device 710 to the IoT server 740 in real time.

According to various embodiments, in operation 785, the IoT server 740 may transmit sensor data and analysis data received from the edge device 710 to the user device 730. The user device 730 may provide the received data (e.g., video streaming or an alarm) to a user through the application.

Figure 8A:
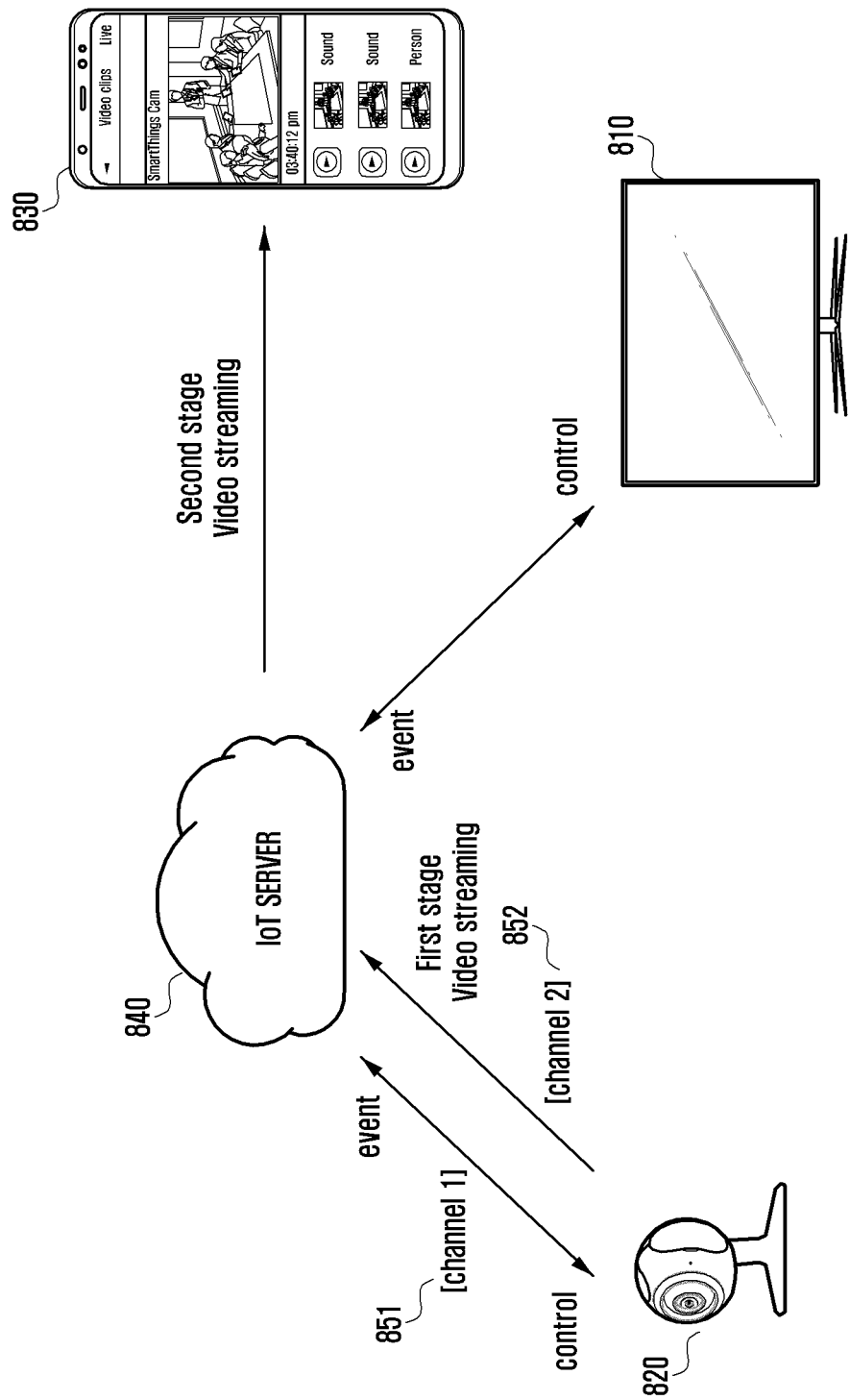
FIG. 8A and FIG. 8B are component diagrams illustrating interactions between devices during operation of an edge computing service method according to various embodiments.
Figure 8B:
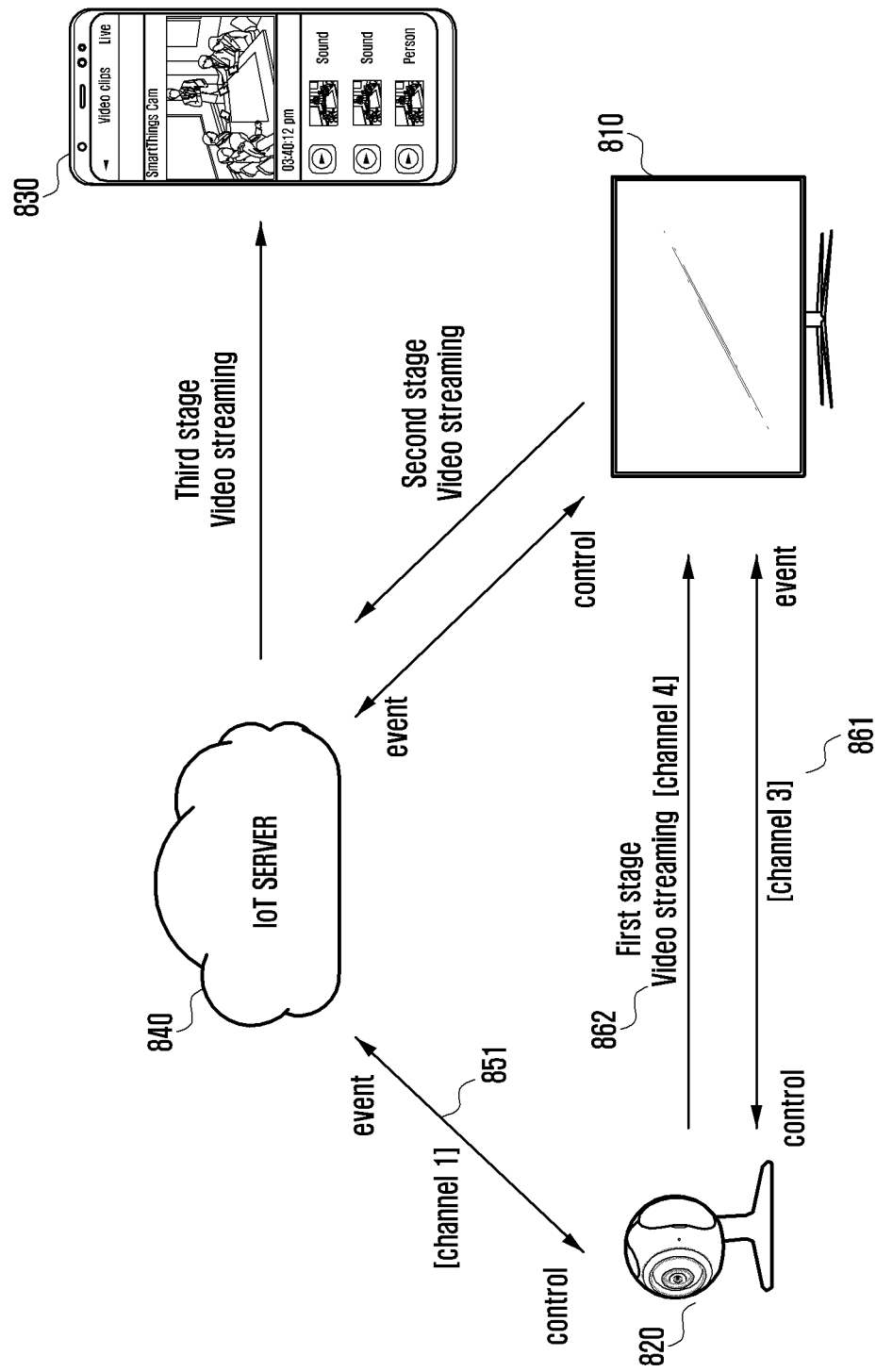

FIG. 8A and FIG. 8B are component diagrams illustrating interactions between devices during operation of an edge computing service method according to various embodiments.

FIG. 8A illustrates an operation of a state where a leaf device 820 (e.g., the leaf device 220 in FIG. 2A or the leaf device 500 in FIG. 5) is connected to a cloud network before the leaf device 820 and an edge device 810 (e.g., the edge device 210 in FIG. 2A or the edge device 400 in FIG. 4) are connected.

Referring to FIG. 8A, a TV positioned on a home network may operate as the edge device 810, and an IP camera may be newly installed as the leaf device 820. The edge device 810 may be pre-registered in an IoT server 840 (e.g., the IoT management server 240 in FIG. 2A) by transmitting device information thereto.

A user may newly purchase and install indoors the leaf device 820 to be connected to the home network via an AP. The leaf device 820 may be registered in the IoT server 840 by transmitting device information of the leaf device 820 thereto.

Referring to FIG. 8A, before the leaf device 820 is connected to the edge device 810 after being registered, the leaf device 820 may transmit data (e.g., video streaming) obtained via a sensor (e.g., the sensor 540 in FIG. 5) to the IoT server 840. According to various embodiments, the leaf device 820 may establish a first channel 851 and a second channel 852 with the IoT server 840, the leaf device 820 and the IoT server 840 may transmit or receive control information and/or event information through the first channel 851, and video streaming obtained by the leaf device 820 may be transmitted (in a first transmission stage) to the IoT server 840 (or a cloud network) through the second channel 852. The IoT server 840 may transmit the obtained video streaming (in a second transmission stage) to a user device 830. The edge device 810 has not been connected to the leaf device 820 yet, and the edge device 810 and the IoT server 840 may establish a channel for transmitting or receiving control information and/or event information.

According to various embodiments, the leaf device 820 and the edge device 810 may broadcast, on a local network, a signal for notifying that each device itself is a device capable of edge computing. If the leaf device 820 identifies a TV that is the edge device 810, the leaf device 820 may connect to the IoT server 840 (e.g., the edge-leaf manager 246 in FIG. 2A or the edge-leaf manager 265 in FIG. 2B) of the edge device 810 and request same to identify providable services. The IoT server 840 (e.g., the edge-leaf manager 246 and the module manager 244 in FIG. 2A) may identify, based on device information of the leaf device 820 and the edge device 810, a service available between the leaf device 820 and the edge device 810, and at least one module required for the edge device 810 to perform the corresponding service.

According to various embodiments, the IoT server 840 may provide the module required for performing the identified service to the edge device 810. For example, the IoT server 840 may provide, to the edge device 810, an audio/video (AV) module which routes video streaming of the leaf device 820 to the IoT server 840 (or cloud network) and functions to communication between the edge device 810 and the IoT server 840, and an AI vision module which performs video analysis.

FIG. 8B illustrates an operation after the leaf device 820 and the edge device 810 are connected to each other.

According to various embodiments, the edge device 810 and the leaf device 820 may establish a connection therebetween on the home network, and the edge device 810 may execute an installed module. The leaf device 820 may transmit video streaming (in a first transmission stage) to the edge device 810 through the established connection, and the edge device 810 may transmit the received video streaming (in a second transmission stage) to the IoT server 840. The edge device 810 may receive, via the AV module, video streaming and control information and/or event information received from the leaf device 820, and the AI vision module may analyze the received video to provide various video analysis-based services, such as facial recognition, or user recognition and tracking. Video streaming and analyzed data may be transmitted (in a third transmission stage) to the user device 830 via the IoT server 840 in real time.

According to another embodiment, the edge device 810 may establish a direct connection with the user device 830, and directly transmit data to the user device 830 without going through the IoT server 840. For example, the edge device 810 may directly transmit video streaming date and data generated by analyzing (e.g., video information-based user recognition, marking, or behavior tracking) video streaming received from the leaf device 820, through a connection established with the user device 830.

According to various embodiments, the edge device 810 and the leaf device 820 may establish a third channel 861 for transmitting or receiving control information and/or event information, and establish a fourth channel 862 for transmitting or receiving video streaming. Referring to FIG. 8B, while video streaming is transmitted to the edge device 810 through edge computing, the second channel 852 for transmission or reception of video streaming between the leaf device 820 and the IoT server 840 need not be used.

According to various embodiments, in a state where the leaf device 820 (e.g., IP camera) and the edge device 810 (e.g., TV) are connected and perform an edge computing service, a new leaf device 820 (e.g., AI speaker) may be connected.

The AI speaker may broadcast, on the local network, that the AI speaker itself is capable of edge computing. When the AI speaker discovers a TV that is an edge device, the AI speaker may connect to the IoT server 840 (e.g., the edge-leaf manager and the module manager in FIG. 2A) to identify providable services. For example, the AI speaker may transmit a connection request to the TV, and the TV may be connected to the AI speaker through an authentication process.

After the AI speaker is connected to the TV, the TV may install, from the IoT server 840, a module related to a service to be provided to the AI speaker. For example, the TV may download, from the IoT server 840 (e.g., the module registry 254 in FIG. 2A), and install a sound module for receiving sound data input in a microphone of the AI speaker, and an AI sound analysis module that analyzes the received sound data.

The TV may execute the installed module and perform an edge computing service. The AI speaker may detect surrounding sound and transfer sound data to the sound module of the TV, and the AI sound analysis module may analyze the received sound data, and transfer the result thereof to the IoT server 840 via the sound module. According to the analysis of sound data as described above, a service, such as pet monitoring, window damage detection, or alarm sound detection, may be performed.

According to various embodiments, an edge device may provide various edge computing services according to data transmitted from a leaf device, and an IoT server may store modules required for each edge computing service.

An example of an edge computing service available with respect to a leaf device and a device module and a service module required accordingly is as follows.

TABLE 1

| Device | Edge computing service | Device module | Service module |
|---|---|---|---|
| Camera | Face Recognition, Object Detection | MQTT Broker AV stream gateway | Face AI, Vision AI (Doorbell Service, Delivery notification) |
| AI Speaker | Speaker Recognition | MQTT Broker AV stream gateway | Speaker AI (Personalized Service) |

TABLE 1-continued

| Device | Edge computing service | Device module | Service module |
| --- | --- | --- | --- |
| TV | Contents Recognition | MQTT Broker AV stream gateway | Contents AI (AD Service (advertisement), Shopping Service) |
| Robot Vacuum Cleaner | Pet Recognition, Bark detection | MQTT Broker AV stream gateway | Pet AI (Pet Service) |
| Camera | Daily Summary | MQTT Broker AV stream gateway | Face AI, Pet AI (Daily Summary Video Clip) |

In [Table 1] above, a message queueing telemetry transport (MQTT) broker may be a module that provides a channel through which a command and/or an event are exchanged between a leaf device and an edge device. For example, an MQTT protocol may include a broker, a publisher, and a subscriber. If an MQTT broker is installed in the edge device 810, the MQTT broker of the edge device may perform a function of relaying a topic issued in the publisher to the subscriber.

An audio video (AV) stream gateway may perform a function of relaying audio and/or video streaming transmitted from a leaf device, to an artificial intelligence (AI) module.

FIG. 9A to FIG. 9C and FIG. 10A to FIG. 10C illustrate application interface screens of a user device according to various embodiments.

Figure 9A:
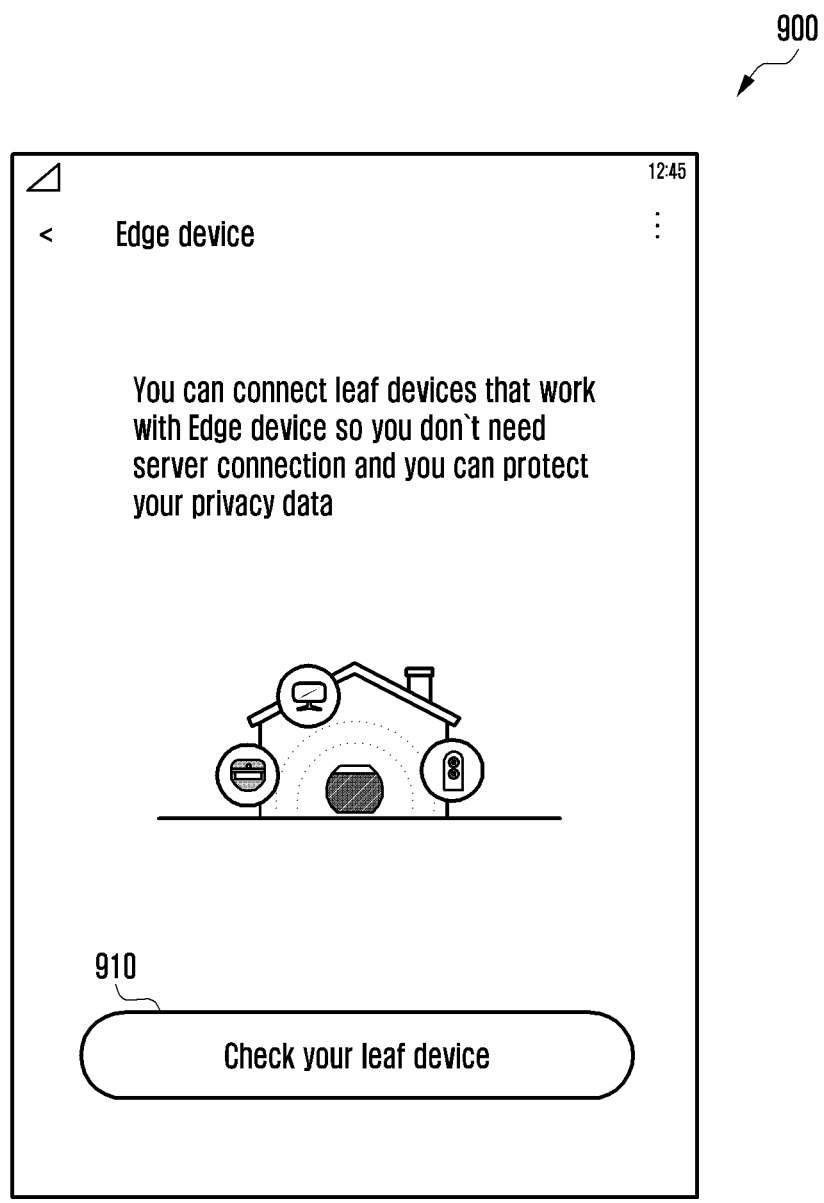
FIG. 9A to FIG. 9C and FIG. 10A to FIG. 10C illustrate application interface screens of a user device according to various embodiments.
Figure 9B:
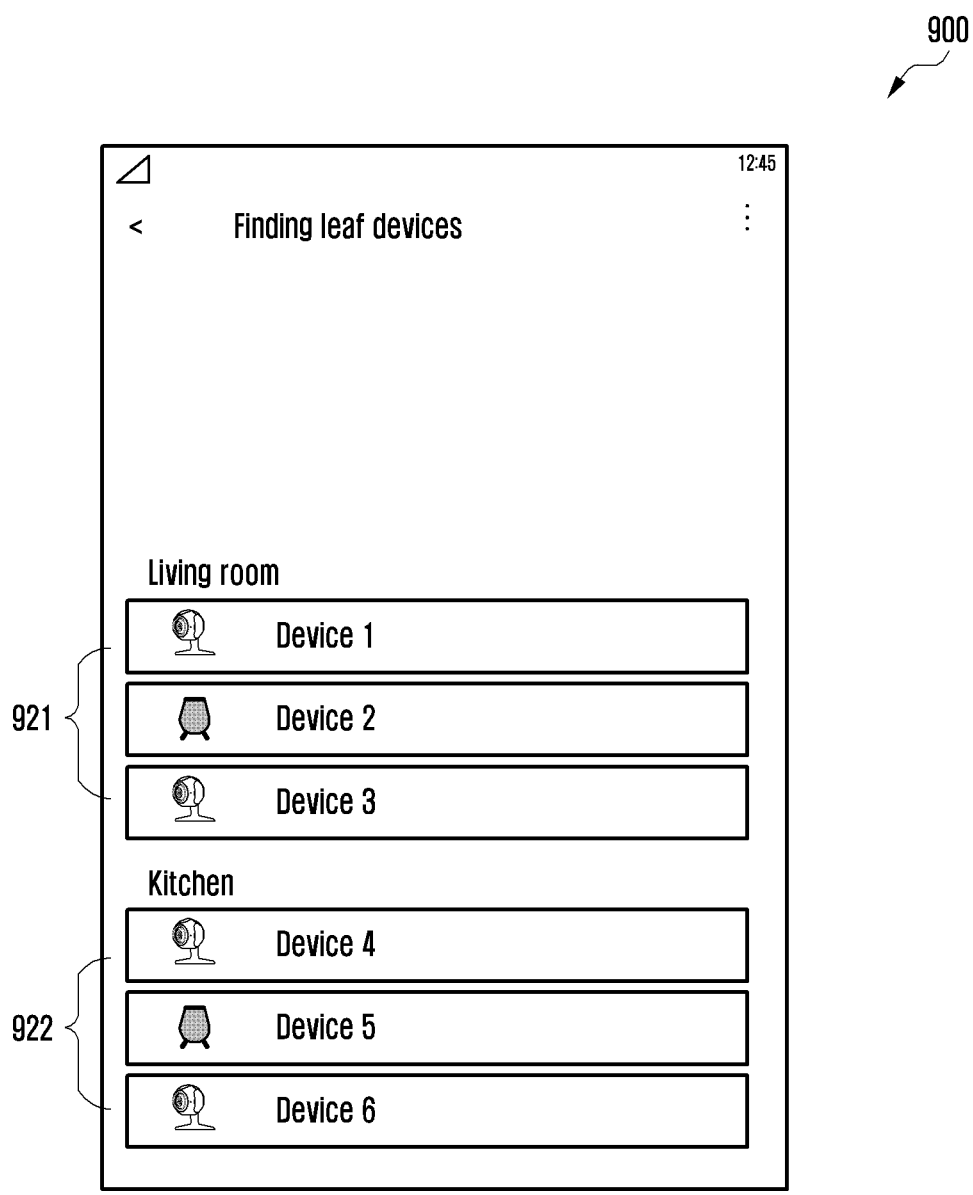
Figure 9C:
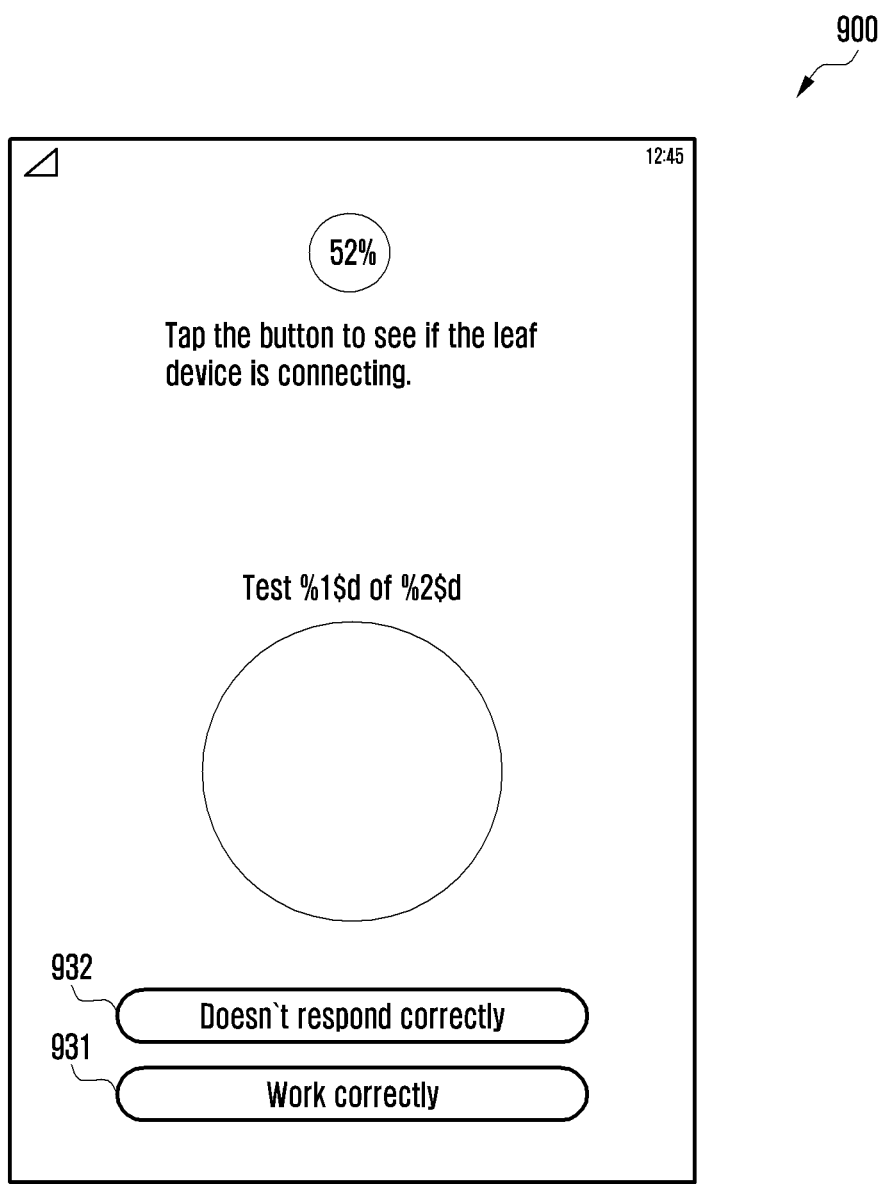

FIG. 9A to FIG. 9C illustrate a user interface of an application for selecting a leaf device (e.g., the leaf device 220 in FIG. 2A or the leaf device 500 in FIG. 5) to be connected to an edge device in a user device 900.

Referring to FIG. 9A, the user device 900 may provide a user interface (UI) for, when a particular edge device is initially registered or reconfigured, initiating a search for a leaf device to be connected to the edge device. According to various embodiments, when a leaf device search menu 910 is selected on the UI, the user device 900 may search for at least one leaf device positioned on a home network (e.g., connected to the same AP) by using a communication module (e.g., the communication module 390 in FIG. 3).

Referring to FIG. 9B, the user device 900 may display lists 921 and 922 of at least one leaf device identified on the home network. According to various embodiments, the user device 900 may display leaf devices to be distinguished according to each position (e.g., living room or kitchen) of the leaf device. According to various embodiments, the UI of the user device 900 is not limited to the illustrated example, and may display leaf devices to be distinguished according to each type (e.g., camera, speaker, or bulb) of the leaf device, or display leaf devices, based on multiple criteria (e.g., type, network registration date, and distance to the user device). The user device 900 may receive an input of selection of a leaf device to be connected to the edge device among the displayed at least one leaf device. The user device 900 may transmit device information of the selected leaf device to an IoT server via the communication module.

If a leaf device to be connected to the edge device is selected by the user device 900, the IoT server may transmit a connection test command to the corresponding edge device and leaf device. The edge device and/or leaf device may transmit a connection test result to the IoT server, and the IoT server may transmit the connection test result to the user device 900.

Referring to FIG. 9C, the user device 900 may display a UI with indicators (e.g., connectable indicator 931 and unconnectable indicator 932) showing whether the selected edge device and leaf device are connectable to each other.

For example, when the edge device and the leaf device are connected to each other, data (e.g., video streaming) obtained by the leaf device may be transmitted to the edge device, and the edge device may transmit data received from the leaf device to the IoT server. The user device 900 may receive the data of the leaf device from the IoT server and display same on the application. According to various embodiments, the edge device may encrypt data (e.g., video) received from the leaf device and transmit the encrypted data to the IoT server, and the user device 900 may receive decoded data of the leaf device, based on a designated key (e.g., a password or an authentication key).

According to various embodiments, when data between the leaf device and the edge device is transmitted to the IoT server, the data may be transferred after being processed in a different type. For example, the edge device may obtain video data from the leaf device, and perform a user recognition function, based on the obtained video data. For example, the edge device may transfer alarm information (e.g., processed data of the leaf device) related to a recognized user to the IoT server and/or the user device 900, based on user recognition, and the user device 900 may obtain the alarm information from the IoT server. For example, data obtained from a sensor of the leaf device may be stored on the home network on which the leaf device and the edge device exist, and the IoT server and/or the user device 900 may receive information processed in a different type (e.g., alarm information) from the edge device.

Figure 10A:
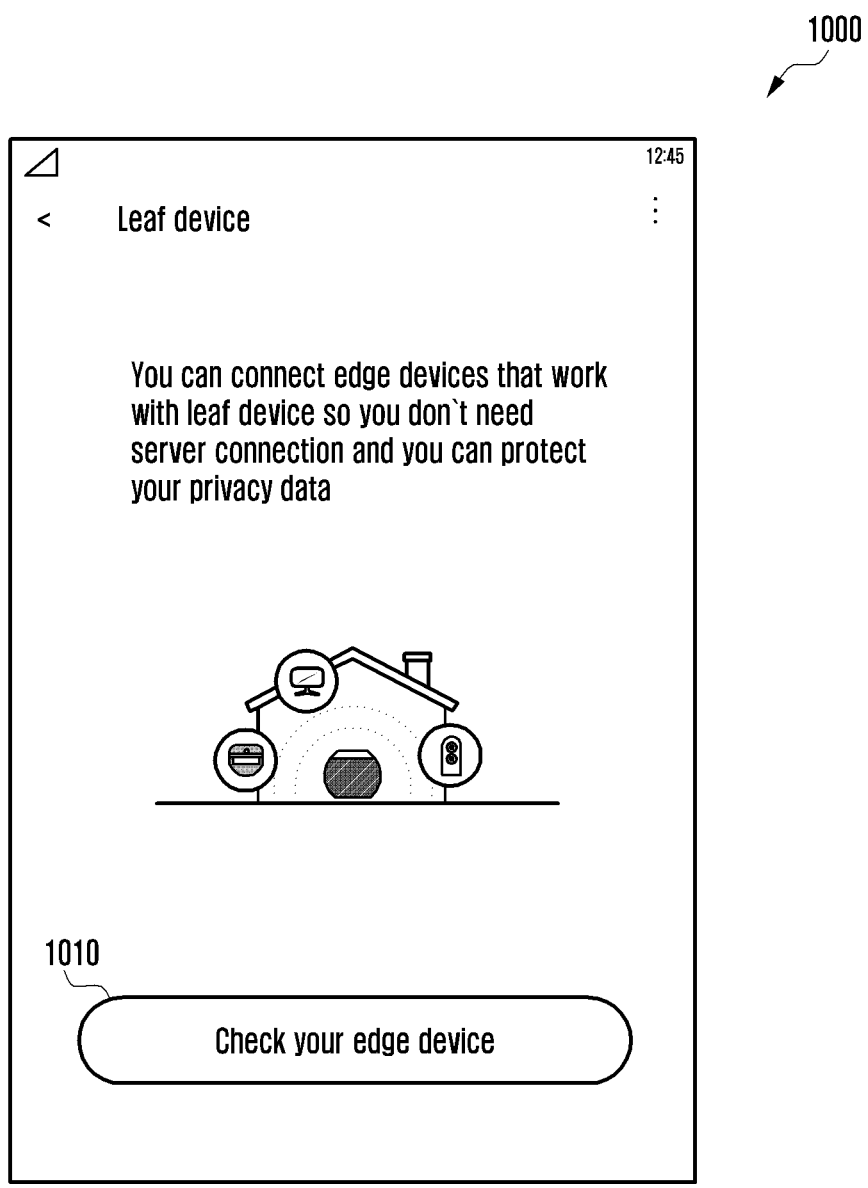
Figure 10B:
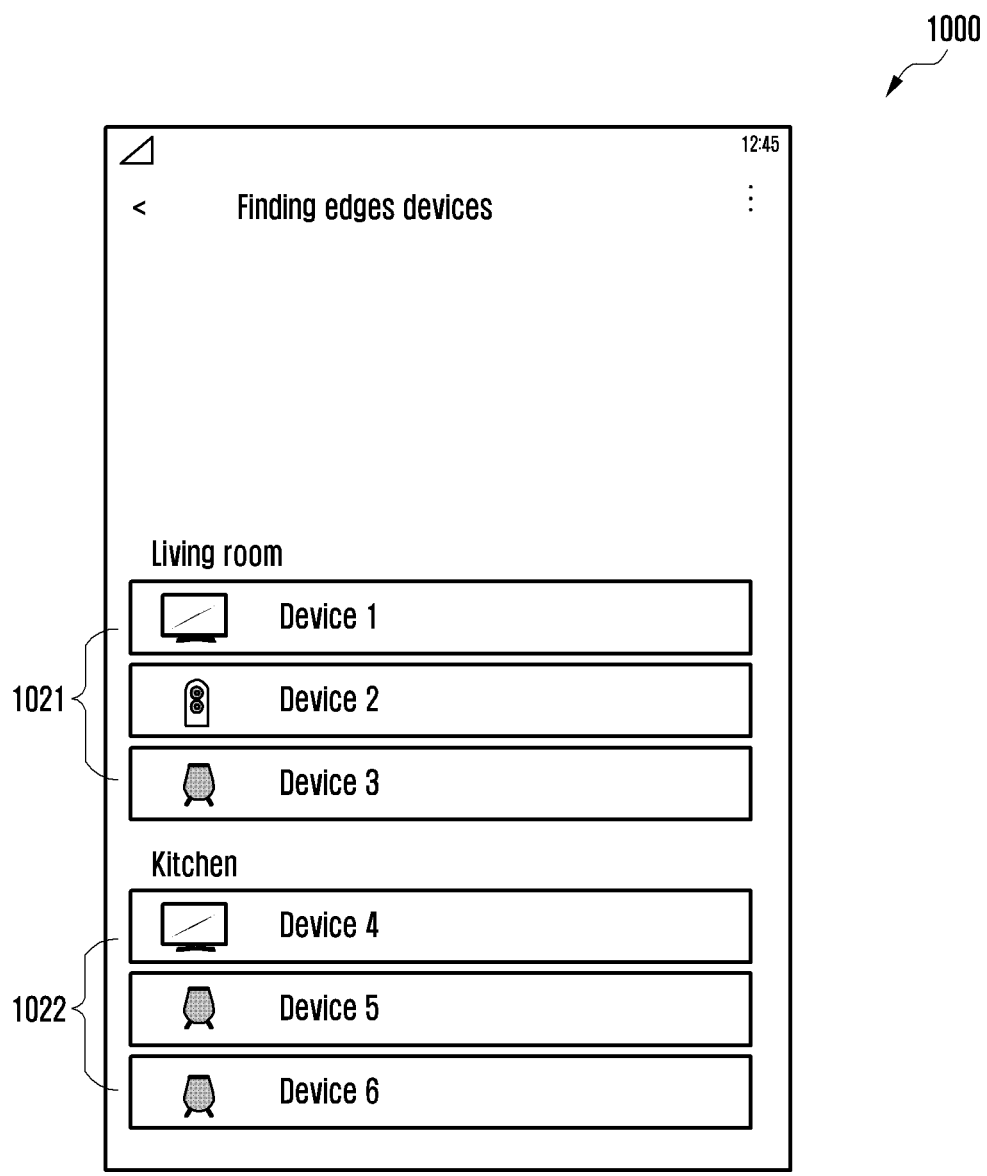
Figure 10C:
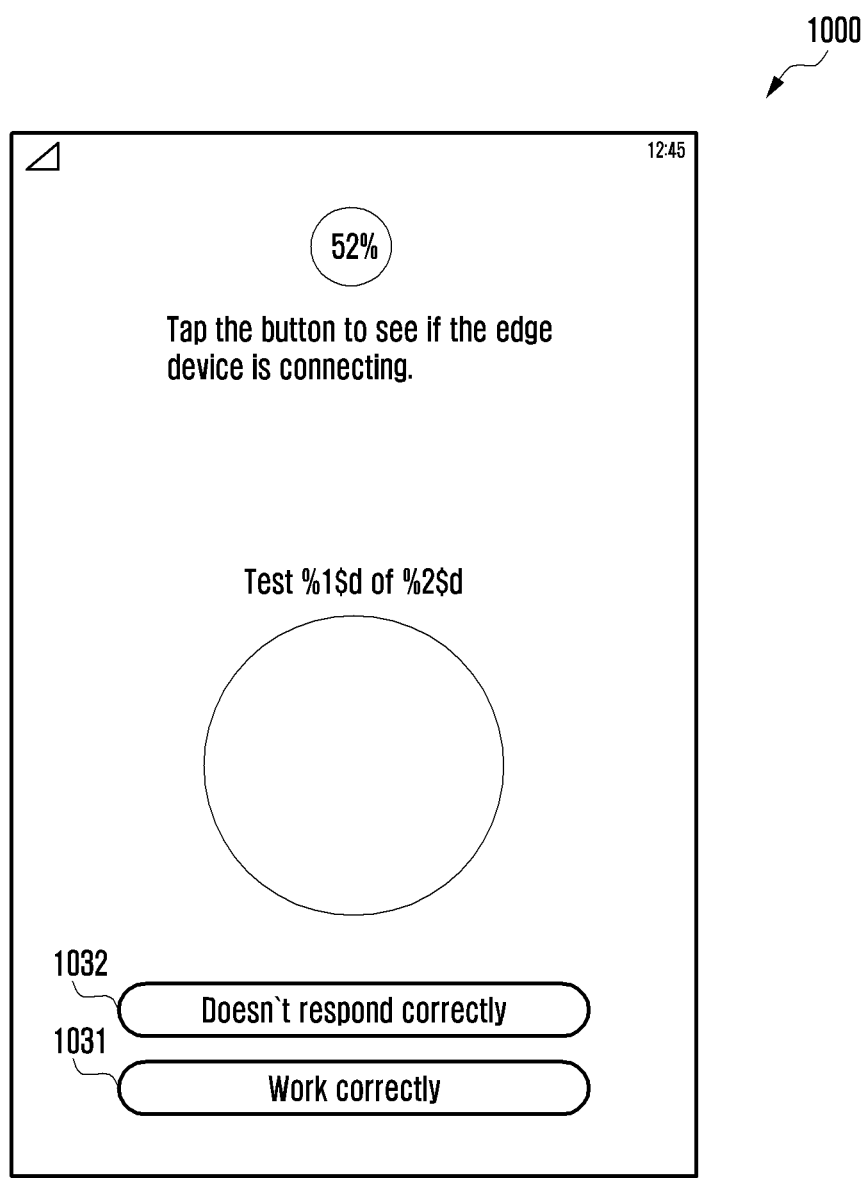

FIG. 10A to FIG. 10C illustrate a user interface of an application for selecting an edge device to be connected to a leaf device in a user device. According to various embodiments, the user interface of the application for selecting the edge device may be configured to be at least partially similar to a user interface (e.g., FIG. 9A to FIG. 9C) of an application for selecting a leaf device.

Referring to FIG. 10A, a user device 1000 may provide a user interface (UI) for, when a particular leaf device is initially registered or reconfigured, initiating a search for an edge device to be connected to the leaf device. According to various embodiments, when an edge device search menu 1010 is selected on the UI, the user device 1000 may search for at least one edge device positioned on a home network (e.g., connected to the same AP) by using a communication module (e.g., the communication module 420 in FIG. 4). For example, the user device may search for a device in which an edge runtime is installed, among several electronic devices of the home network.

Referring to FIG. 10B, the user device 1000 may display lists 1021 and 1022 of at least one edge device identified on the home network. According to various embodiments, the user device 1000 may display edge devices to be distinguished according to each position (e.g., living room or kitchen) of the edge device. A user may select one edge device connected to the leaf device on the displayed lists.

According to various embodiments, an IoT server may store a user account and/or position information of an edge device and a leaf device in a database, and the user device 1000 may display a list of leaf devices or edge devices registered to have the same user account and/or position as that of a corresponding edge device or leaf device when searching for a surrounding device.

Referring to FIG. 10C, the user device 1000 may display a UI with indicators (e.g., connectable indicator 1031 and unconnectable indicator 1032) showing whether the selected edge device and leaf device are connectable to each other.

For example, when the edge device and the leaf device are connected to each other, data (e.g., video streaming) obtained by the leaf device may be transmitted to the edge device, and the edge device may transmit data received from the leaf device to the IoT server. The user device 1000 may receive the data of the leaf device from the IoT server and display same on the application.

According to various embodiments, the IoT server may provide a designated leaf device and/or edge device rather than the lists 921 and 922 of at least one leaf device in FIG. 9B and/or the lists 1021 and 1022 of at least one edge device in FIG. 10B. For example, in a case of an operation related to searching for a leaf device, the IoT server may determine an optimal leaf device from the database of the IoT server, and provide the determined leaf device to the user device 900. In addition, in a case of an operation related to searching for an edge device, the IoT server may determine an optimal edge device from the database of the IoT server, and provide the determined edge device to the user device 1000. According to various embodiments, an operation of determining an optimal leaf device and/or edge device may be performed based on at least one of a network registration date or numerical value information (e.g., ranking) on a hardware condition (e.g., CPU, GPU, or memory) of a leaf device and/or an edge device.

Figure 11:
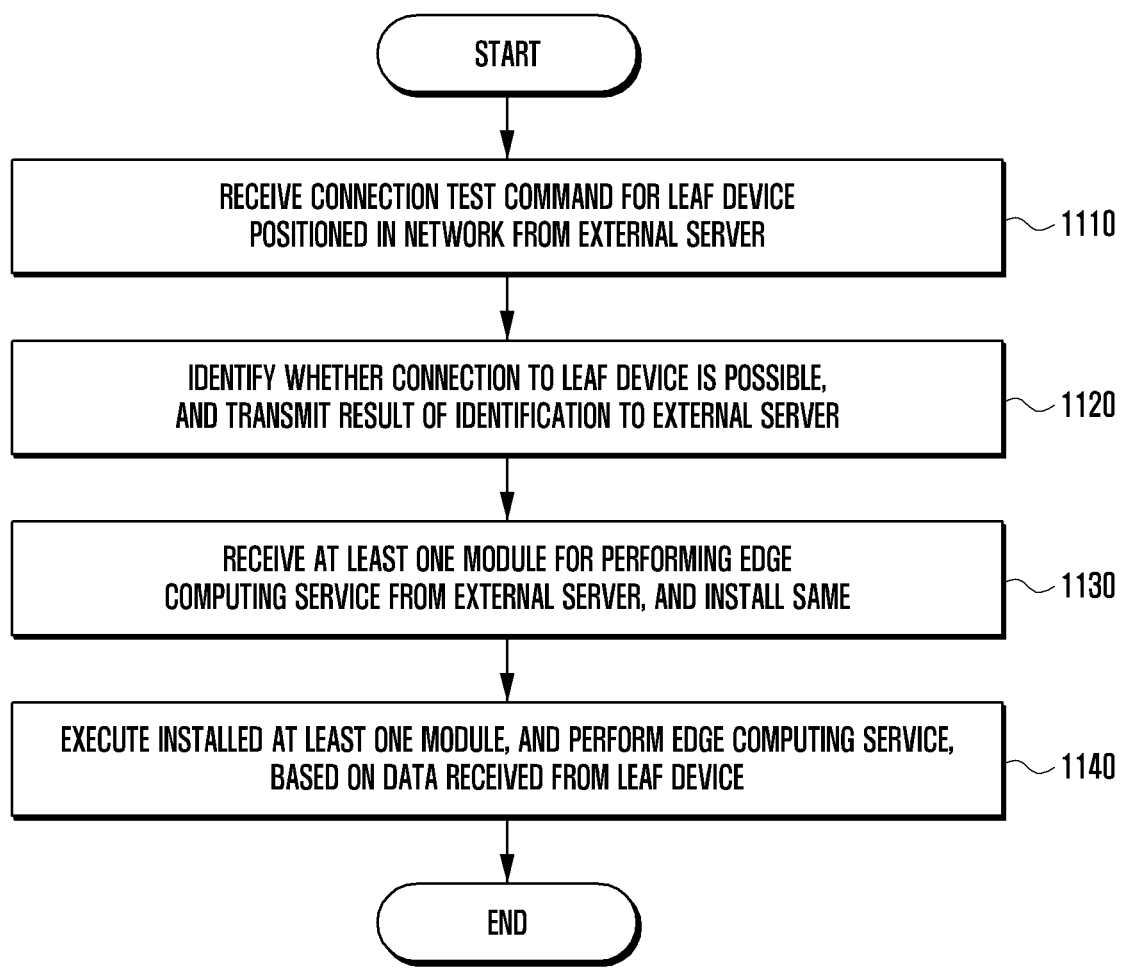
FIG. 11 is a flowchart illustrating an edge computing service method of an edge device according to various embodiments.

FIG. 11 is a flowchart illustrating an edge computing service method of an edge device according to various embodiments.

The illustrated method may be performed by an edge device (e.g., the edge device 210 in FIG. 2A, the edge device 400 in FIG. 4, the edge device 610 in FIG. 6, or the edge device 710 in FIG. 7) described above, and a technical feature described above will not be described hereinafter.

In operation 1110, an edge device may receive a connection test command for a leaf device from an external server (e.g., the IoT management server 240 in FIG. 2A). The connection test command may include identification information and/or network information of the leaf device. The external server may search for at least one leaf device connectable with the edge device among pre-registered several leaf devices and transmit a connection test command for a leaf device selected by a user device to the edge device.

In operation 1120, in response to the reception of the connection test command, the edge device may identify whether a connection to the leaf device is possible, by using a communication module, and transmit a result of the identification to the external server.

In operation 1130, when a connection test result indicates that the leaf device is connectable, the edge device may receive at least one module for performing an edge computing service from the external server, and store and install same in a memory. The external server may identify a performable edge computing service, based on device information of the leaf device and device information of the edge device, for example, identification information (e.g., a device ID, a manufacturer, a model name, a capability, and a device type), position information (e.g., room or living room), and network information (e.g., IP address), and may provide a module required for performing the corresponding service to the edge device.

For example, if the leaf device an IP camera, the external server may provide an AV module required for receiving video streaming transmitted from the leaf device, and transmitting same to a cloud network, and an AI vision module that performs video analysis in an AI vision service. Alternatively, if the leaf device is an AI speaker, the external server may provide a sound module required for required for receiving sound data transmitted from the leaf device and transmitting same to the cloud network, and an AI sound analysis module that analyzes the received sound data.

In operation 1140, the edge device may execute the installed at least one module, and may perform the edge computing service, based on data received from the leaf device. For example, if the leaf device is an IP camera, the edge device may provide various video analysis-based services, such as facial recognition, or user recognition and tracking, by analyzing a received video by using the AI vision module. Alternatively, if the leaf device is an AI speaker, the edge device may perform a service, such as pet monitoring, window damage detection, or alarm sound detection, by analyzing sound data by using the AI sound analysis module. A processor may transmit sensor data received from the leaf device and analysis data generated by the service module to a cloud network in real time by using a communication module.

Figure 12:
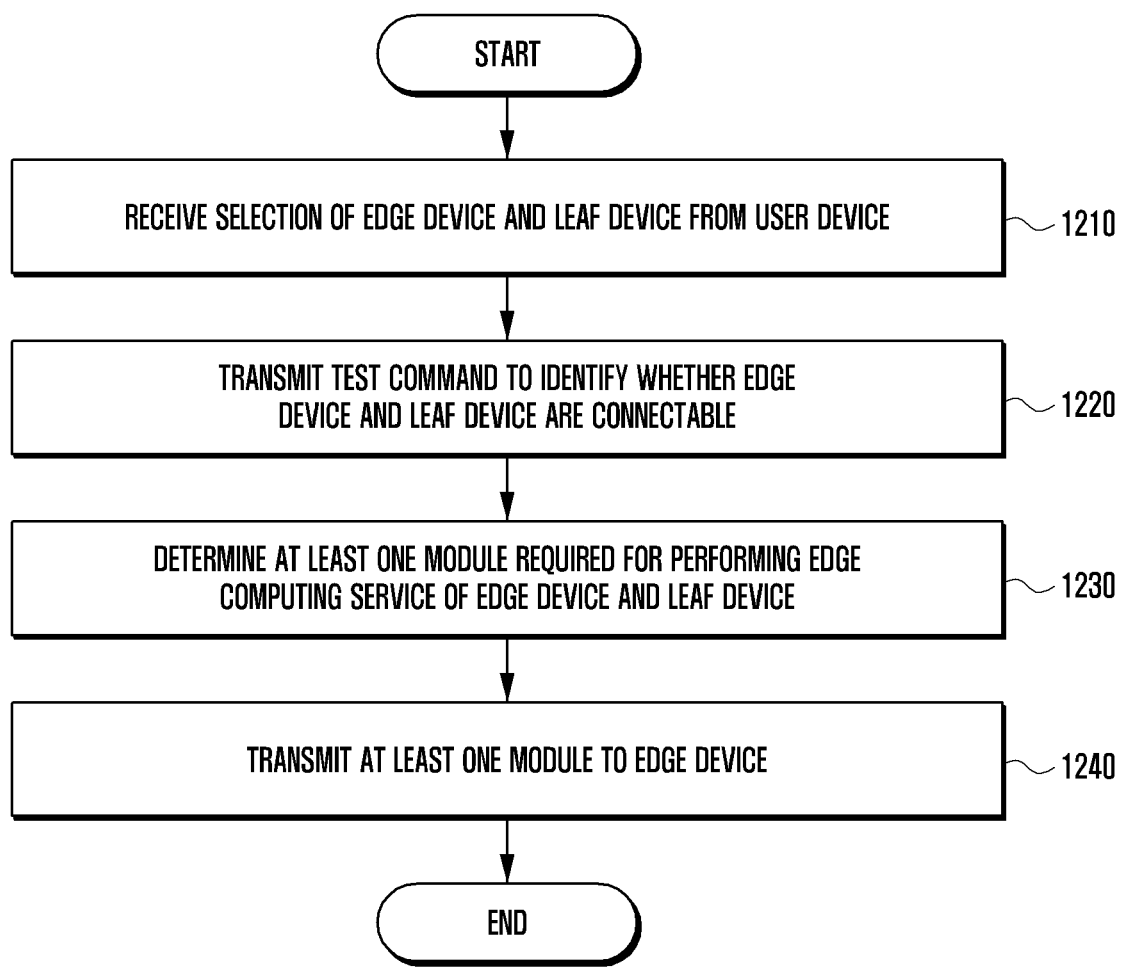
FIG. 12 is a flowchart illustrating an edge computing service method of an IoT server according to various embodiments.

FIG. 12 is a flowchart illustrating an edge computing support method of an IoT server according to various embodiments.

The illustrated method may be performed by an IoT server (e.g., the IoT server 740 in FIG. 7) described above, and a technical feature described above will not be described hereinafter. The illustrated method may be performed by one IoT server, and some of illustrated operations may be dispersedly processed by multiple server devices (e.g., the IoT management server 240 and the IoT hub server 250 in FIG. 2A).

In operation 1210, an IoT server may receive selection of an edge device and a leaf device from a user device. The user device may select an edge device and a leaf device to connect to each other for an edge computing service on a user interface of an application, and transmit same to the IoT server.

In operation 1220, the IoT server may transmit a test command to identify whether the edge device and the leaf device are connectable. The edge device and/or the leaf device may attempt to wirelessly connect to a counterpart device, and then notify the IoT server of a result thereof.

In operation 1230, if the edge device and the leaf device are identified as being connectable, the IoT server may determine at least one module required for performing an edge computing service, based on device information of the edge device and the leaf device. For example, if the leaf device an IP camera, the IoT server may provide an AV module required for receiving video streaming transmitted from the leaf device, and transmitting same to a cloud network, and an AI vision module that performs video analysis in an AI vision service. Alternatively, if the leaf device is an AI speaker, the IoT server may provide a sound module required for required for receiving sound data transmitted from the leaf device and transmitting same to the cloud network, and an AI sound analysis module that analyzes the received sound data.

In operation 1240, the IoT server may transmit at least one module stored in the IoT server to the edge device. Alternatively, if a module required for an edge computing service is stored in a different server device (e.g., IoT hub server) as illustrated in FIG. 2A, the IoT server may request the IoT hub server to transmit at least one module to the edge device.

Figure 13:
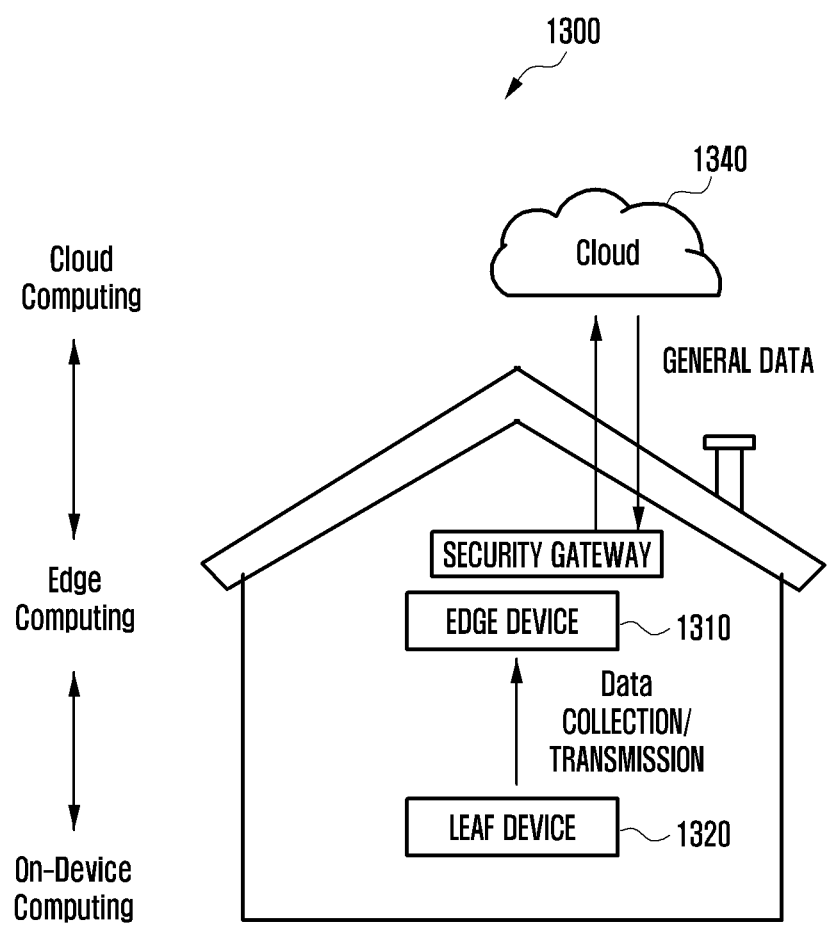
FIG. 13 illustrates an AI computing distributed processing platform according to various embodiments.

FIG. 13 illustrates an AI computing distributed processing platform according to various embodiments.

Referring to FIG. 13, an AI computing distributed processing platform 1300 may include a leaf device 1320, an edge device 1310, and a cloud network 1340 (e.g., the IoT management server 240 and the IoT hub server 250 in FIG. 2A or the IoT server 260 in FIG. 2B). According to various embodiments, the edge device 1310 may include not only a TV (e.g., the TV 112 in FIG. 1) or a table PC (e.g., the tablet PC 111 in FIG. 1) but also consumer premises equipment (CPE) of a fixed wireless access (FWA) type of 4G and 5G communication.

According to various embodiments, the AI computing distributed processing platform 1300 may dispersedly perform AI computing processing related to data obtained by the leaf device 1320, based on sensitivity of the data and/or a computing resource of each device.

For example, if the leaf device is not connected to the edge device or the cloud network, on-device AI computing processing may be performed using a hardware and/or software resource of the leaf device. If the leaf device 1320 is connected to the edge device 1310 and the edge device 1310 is able to execute a module for AI computing processing, data having a high sensitivity among pieces of data generated in the leaf device 1320 may be processed by AI computing (edge AI computing) on the edge device 1310, and data (e.g., general data) having a low sensitivity may be transmitted to the cloud network 1340 via the edge device 1310 and then be processed by AI computing (cloud AI computing) on a cloud. Alternatively, if the leaf device 1320 includes hardware capable of AI computing processing, some of AI computing may be dispersedly processed by on-device AI computing on the leaf device 1320.

Figure 14:
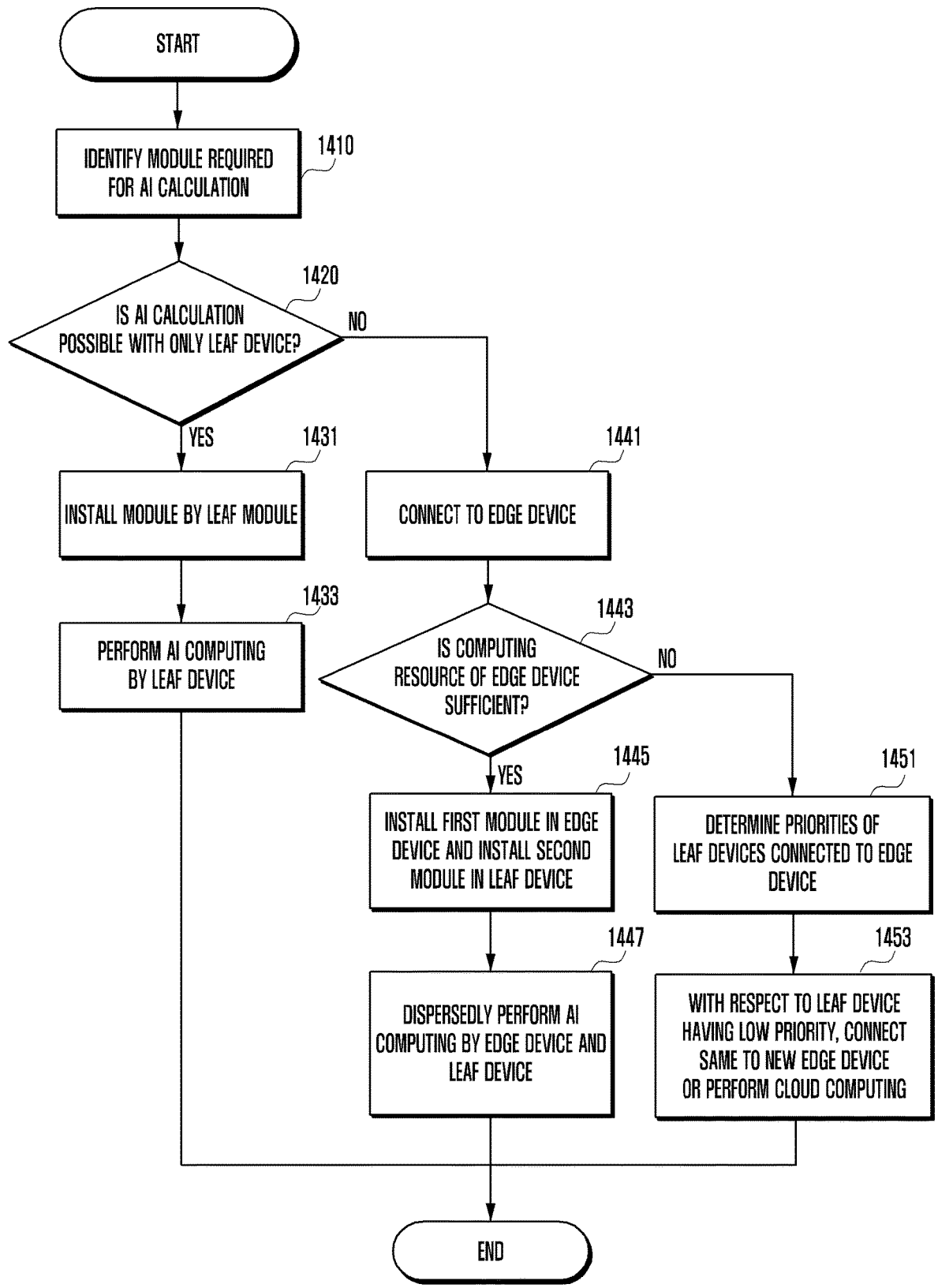
FIG. 14 is a flowchart illustrating an AI computing distributed processing method according to various embodiments.

FIG. 14 is a flowchart illustrating an AI computing distributed processing method according to various embodiments.

The illustrated method may be performed by the leaf device, the edge device, and the cloud network (e.g., the IoT management server and the IoT hub server in FIG. 2A or the IoT server in FIG. 2B).

In this embodiment, an edge device is a TV, and may execute an edge runtime in addition to a unique function of video output. An edge device may be registered in an IoT server by transmitting device information thereto. A leaf device may include an AI speaker or an AI camera.

In operation 1410, an IoT server may identify a module required for AI calculation of data generated in a leaf device. For example, the AI calculation may include an AI vision service that analyzes video data obtained by the leaf device (e.g., IP camera) and an AI sound service that analyzes sound data obtained by the leaf device (e.g., AI speaker).

In operation 1420, the IoT server may identify whether the leaf device is capable of the AI calculation. For example, the IoT server may identify whether the leaf device satisfies a hardware condition (e.g., CPU, GPU, or memory) required by the module (e.g., an AI vision module and an AI sound module) required for the AI calculation.

If a result of determination of operation 1420 indicates that the leaf device is capable of the AI calculation, in operation 1431, the IoT server may transmit the module required for the AI calculation to the leaf device, and the leaf device may store and install the corresponding module.

In operation 1433, the leaf device may use the installed module to perform on-device AI computing processing. In this case, the leaf device may transmit a result of the AI computing processing to the IoT server and AI computing need not be performed on an edge device.

If the AI calculation is unable to be performed only by the leaf device, in operation 1441, an edge device and the leaf device may establish mutual connection therebetween so that the edge device dispersedly processes the AI calculation. For example, the edge device and the leaf device may broadcast, on the same local network, that each device itself is a device capable of edge computing. When the leaf device discovers the edge device, the leaf device may connect to the IoT server, identify a providable service, and then request connection. The edge device that has received a connection request may be connected to the leaf device through an authentication process.

In operation 1443, the edge device may identify whether a computing required for performing the AI calculation requested by the connected at least one leaf device is sufficient. For example, if only one leaf device is connected to the edge device, the computing resource may be determined as being sufficient, and if the number of connected leaf devices is equal to or greater than a predetermined number, the computing resource is determined as being insufficient.

If the computing resource of the edge device is sufficient, in operation 1445, a first service module for performing the AI calculation may be installed in the edge device, and a second service module may be installed in the leaf device.

For example, the first service module and the second service module are some of modules for performing the AI sound service, the second service module may be a voice signal pre-processing module, and the first service module may be a different recognition module. According to various embodiments, the first service module and the second service module may be changed according to a hardware characteristic (e.g., CPU or memory) of the leaf device. For example, if the leaf device does not have enough hardware resources, the second service module may include a voice signal pre-processing module, and the first service module may include a different voice recognition module. On the contrary, if the leaf device has enough hardware resources, the leaf device may include a voice recognition module including a voice signal pre-processing module.

In operation 1447, the edge device and the leaf device may dispersedly perform edge AI computing by using the installed modules.

If a result of the identification of operation 1443 indicates that the computing required for performing the AI calculation requested by the connected at least one leaf device is insufficient, the edge device may, in operation 1451, determine the priorities of the leaf devices connected to the edge device. An edge device may have more computing resources than a leaf device, but less than the cloud. Therefore, if there are many leaf devices connected to an edge device, AI distributed processing by the edge device may be difficult.

According to various embodiments, the edge device may determine the priorities between leaf devices according to sensitivity (e.g., privacy) of data transmitted from each leaf device. For example, the sensitivity of the AI vision service may be higher than that of the AI voice recognition service.

In addition, the sensitivity of an AI camera for capturing an image of an indoor space may be higher than that of an AI camera for capturing an image of an outdoor space. The sensitivity and/or priority as described above may also be determined according to a user's selection. According to various embodiments, a configuration related to sensitivity of a service (e.g., AI vision service or AI voice recognition), sensitivity of a camera, and/or whether information is personal information is not limited to the described example, and may be determined (or changed) based on a user selection or designated policy information. In addition, the designated policy information may include policy information pre-stored in the leaf device 1320, the edge device 1310, and/or the cloud network 1340.

In operation 1453, the edge device may receive a service module related to a leaf device having a high priority from the IoT server, and install same. In addition, a leaf device having a low priority may be connected to a new edge device to perform AI distributed processing or may perform AI calculation through cloud computing.

An electronic device (e.g., the user device, the leaf device, and the edge device in FIG. 2A) according to various embodiments disclosed herein may be various types of devices. The electronic device may include, for example, a portable communication device (e.g., a smartphone), a computer device, a portable multimedia device, a portable medical device, a camera, a wearable device, or a home appliance. An electronic device according to an embodiment disclosed herein is not limited to the above devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
a communication module;
a memory; and
a processor configured to:
receive a connection test command for a leaf device from an external server by using the communication module;
based on receiving the connection test command, identify whether the leaf device is communicatively connectable to the electronic device, by using the communication module, and transmit a result of the identification to the external server;

based on the result indicating the leaf device is communicatively connectable to the electronic device, receive at least one module configured to perform an edge computing service from the external server, and store and install the at least one module in the memory; and execute the installed at least one module to perform the edge computing service, based on data received from the leaf device.

2. The electronic device of claim 1, wherein the processor is further configured to transmit device information comprising at least one of identification information, position information, and network information of the electronic device to the external server to request registration of the electronic device.

3. The electronic device of claim 1, wherein the processor is further configured to:

identify at least one external device in a network, to which the electronic device belongs, by using the communication module;

transmit identification information of the at least one external device identified using the communication module to the external server; and receive a connection test command for the leaf device selected by a user device or the external server among the at least one external device.

4. The electronic device of claim 1, wherein the at least one module comprises a device module configured to receive data transmitted from the leaf device and transmit the received data to the external server.

5. The electronic device of claim 4, wherein the processor is further configured to, based on receiving data from the leaf device according to a first protocol, transmit the data to the external server according to a second protocol by using the device module.

6. The electronic device of claim 1, wherein the at least one module comprises a service module configured to perform the edge computing service, based on the data received from the leaf device.

7. The electronic device of claim 6, wherein the service module is configured to analyze video data received from the leaf device to perform a service including at least one of object recognition and object tracking.

8. The electronic device of claim 1, wherein the connection test command is received from an Internet of Things (IoT) management server, and wherein the at least one module is received from an IoT hub server.

9. An edge computing service support method of an Internet of Things (IoT) server, the method comprising:

transmitting, to an edge device, a test command for identifying whether the edge device and a leaf device selected based on a user input on a user device are communicatively connectable to each other;

based on identifying that the edge device and the leaf device are communicatively connectable, determine at least one module required for performing an edge computing service based on data acquired by the leaf device, based on device information of the edge device and device information of the leaf device; and transmitting the at least one module to the edge device, or requesting an IoT hub server to transmit the at least one module to the edge device.

10. The edge computing service support method of claim 9, further comprising:

receiving device information of the edge device from one of the user device and the edge device, and registering the edge device; and receiving device information of the leaf device from one of the user device and the leaf device and registering the leaf device.

11. The edge computing service support method of claim 9, wherein the determining the at least one module required for performing the edge computing service comprises:

identifying a performable edge computing service to correspond to the device information of the edge device and the device information of the leaf device; and determining the at least one module required for performing the edge computing service on a database.

12. The edge computing service support method of claim 11, wherein the at least one module comprises a device module configured to enable the edge device to receive data transmitted from the leaf device and transmit the received data to an external server, and a service module configured to enable the edge device to analyze the data transmitted from the leaf device to perform the edge computing service.

13. The edge computing service support method of claim 12, wherein the service module is configured to analyze video data received from the leaf device to perform a service including at least one of object recognition and object tracking.

14. The edge computing service support method of claim 9, comprising:

based on the edge device not being connected to the leaf device, transmitting or receiving control information through a first channel connected to the leaf device, and receiving data obtained by the leaf device through a second channel connected to the leaf device; and based on the edge device being connected to the leaf device, maintaining the first channel and receiving data obtained by the leaf device from the edge device.

15. The edge computing service support method of claim 9, further comprising:

transmitting, to the leaf device, the test command for identifying whether the leaf device and the edge device are communicatively connectable.

16. An edge computing method of an electronic device, the method comprising:

receiving a connection test command for a leaf device from an external server;

based on the receiving the connection test command, identifying whether the leaf device is communicatively connectable to the electronic device, and transmitting a result of the identifying to the external server;

based on the result indicating the leaf device is communicatively connectable to the electronic device, receiving at least one module configured to perform an edge computing service from the external server, and storing and installing the at least one module in a memory; and executing the installed at least one module to perform the edge computing service, based on data received from the leaf device.

17. The edge computing method of claim 16, further comprising transmitting device information comprising at least one of identification information, position information, and network information of the electronic device to the external server to request registration of the electronic device.

18. The edge computing method of claim 16, wherein the at least one module comprises a device module configured to receive data transmitted from the leaf device and transmit the received data to the external server.

19. The edge computing method of claim 18, wherein the executing the installed at least one module to perform the edge computing service comprises transmitting data received from the leaf device according to a first protocol to the external server according to a second protocol by using the device module.

20. The edge computing method of claim 16, wherein the at least one module comprises a service module configured to perform the edge computing service, based on the data received from the leaf device.

* * * * *